US012437692B2

(12) United States Patent
Yuan et al.

(10) Patent No.: US 12,437,692 B2
(45) **Date of Patent: *Oct. 7, 2025**

(54) DISPLAY PANEL, INTEGRATED CHIP COMPONENT AND DISPLAY DEVICE

(71) Applicant: Shanghai Tianma Microelectronics Co., Ltd., Shanghai (CN)

(72) Inventors: Yong Yuan, Shanghai (CN); Jujian Fu, Shanghai (CN); Ping An, Shanghai (CN)

(73) Assignee: SHANGHAI TIANMA MICROELECTRONICS CO., LTD., Shanghai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/797,541

(22) Filed: Aug. 8, 2024

(65) Prior Publication Data

US 2024/0395185 A1 Nov. 28, 2024

Related U.S. Application Data

(63) Continuation of application No. 18/102,783, filed on Jan. 30, 2023, now Pat. No. 12,080,210.

(30) Foreign Application Priority Data

May 18, 2022 (CN) ........................ 202210539568.5

(51) Int. Cl.
*G09G 3/20* (2006.01)

(52) U.S. Cl.
CPC ....... *G09G 3/20* (2013.01); *G09G 2300/0819* (2013.01); *G09G 2300/0842* (2013.01);
(Continued)

(58) Field of Classification Search
CPC ......... H10K 59/00–95; G09G 2330/21; G09G 3/3233; G09G 2330/028
See application file for complete search history.

(56) References Cited

U.S. PATENT DOCUMENTS

2022/0036810 A1* 2/2022 Gu ............................ G06T 7/11

FOREIGN PATENT DOCUMENTS

CN 111369946 A 7/2020
CN 111785761 A 10/2020
(Continued)

OTHER PUBLICATIONS

The First Office Action dated Jan. 27, 2025 for Chinese Application No. 202210539568.5, 20 pages.

*Primary Examiner* — Sanjiv D. Patel
(74) *Attorney, Agent, or Firm* — East IP P.C.

(57) ABSTRACT

A display panel includes: first and second display areas; first and second pixel circuits connected to light-emitting elements in the first and second display areas, respectively; and first pixel units and second pixel units, each first pixel unit comprising a first pixel circuit and a light-emitting element connected to the first pixel circuit, and each second pixel unit comprising a second pixel circuit and a light-emitting element connected to the second pixel circuit, wherein each first pixel unit includes the light-emitting element emitting light of a first color, each second pixel unit includes the light-emitting element emitting light of a second color, the first color is different from the second color, each first pixel unit is configured to receive a first power supply signal and a second power supply signal, and each second pixel unit is configured to receive a third power supply signal and a fourth power supply signal.

19 Claims, 12 Drawing Sheets

(52) U.S. Cl.
CPC ............... *G09G 2300/0861* (2013.01); *G09G 2320/0233* (2013.01); *G09G 2330/021* (2013.01)

(56) References Cited

FOREIGN PATENT DOCUMENTS

| | | | |
|---|---|---|---|
| CN | 112038373 | A | 12/2020 |
| CN | 112133250 | A | 12/2020 |
| CN | 112712770 | A | 4/2021 |
| CN | 113517317 | A | 10/2021 |
| CN | 113781943 | A | 12/2021 |
| WO | 2021147032 | A1 | 7/2021 |

* cited by examiner

DISPLAY PANEL, INTEGRATED CHIP COMPONENT AND DISPLAY DEVICE

CROSS-REFERENCE TO RELATED APPLICATION

This application is a continuation of U.S. patent application Ser. No. 18/102,783, filed on Jan. 30, 2023, which claims priority to Chinese Patent Application No. 202210539568.5, filed on May 18, 2022. These applications are hereby incorporated by reference in its entirety.

TECHNICAL FIELD

The present application relates to the field of display technology, and particularly relates to a display panel, an integrated chip component and a display device.

BACKGROUND

With the development of the display technology, different areas in the display panel are often configured to implement different functions. In different areas of the display panel, colors of light emitted by light-emitting elements, distribution densities of light-emitting elements and the number of light-emitting elements driven by a pixel circuit may be different.

When devices in the different areas of the display panel are configured differently, in order to ensure uniformity of final display effects of the display panel, different display areas need to be configured and adjusted separately.

However, the separate adjustments performed on different display areas in the related art cannot ensure that the display effects of the different display areas can be uniform, thereby affecting display uniformity of the display panel.

SUMMARY

Embodiments of the present application provide a display panel, an integrated chip component and a display device, which can solve the technical problem that display effects of different display areas are different and affect the overall display uniformity.

An aspect of the embodiments of the present application provides a display panel including:

- a first display area and a second display area;
- pixel circuits comprising first pixel circuits and second pixel circuits, at least one of the first pixel circuits being connected to at least one of light-emitting elements in the first display area, and the second pixel circuits being connected to at least one of light-emitting elements in the second display area; and
- first pixel units and second pixel units, at least one of the first pixel units comprising a first pixel circuit and at least one light-emitting element connected to the first pixel circuit, and tat least one of the second pixel units comprising a second pixel circuit and at least one light-emitting element connected to the second pixel circuit;
- wherein at least one of the first pixel units comprises the light-emitting element emitting light of a first color, at least one of the second pixel units comprises the light-emitting element emitting light of a first color, and the first color is different from the second color,
- wherein at least one of the first pixel units is configured to receive a first power supply signal V1 and a second power supply signal V2, V1>V2; and at least one of the second pixel units is configured to receive a third power supply signal V3 and a fourth power supply signal V4, V3>V4;
- wherein $|V1-V2| \neq |V3-V4|$.

Another aspect of the embodiments of the present application provides a display device including the above display panel.

BRIEF DESCRIPTION OF THE DRAWINGS

In order to illustrate technical solutions of embodiments of the present application more clearly, the drawings required for the embodiments of the present application will be briefly described. Obviously, the drawings described below are only some embodiments of the present application. For a person skilled in the art, other drawings can also be obtained from these drawings without any inventive effort.

REFERENCE SIGNS

Figure 1:
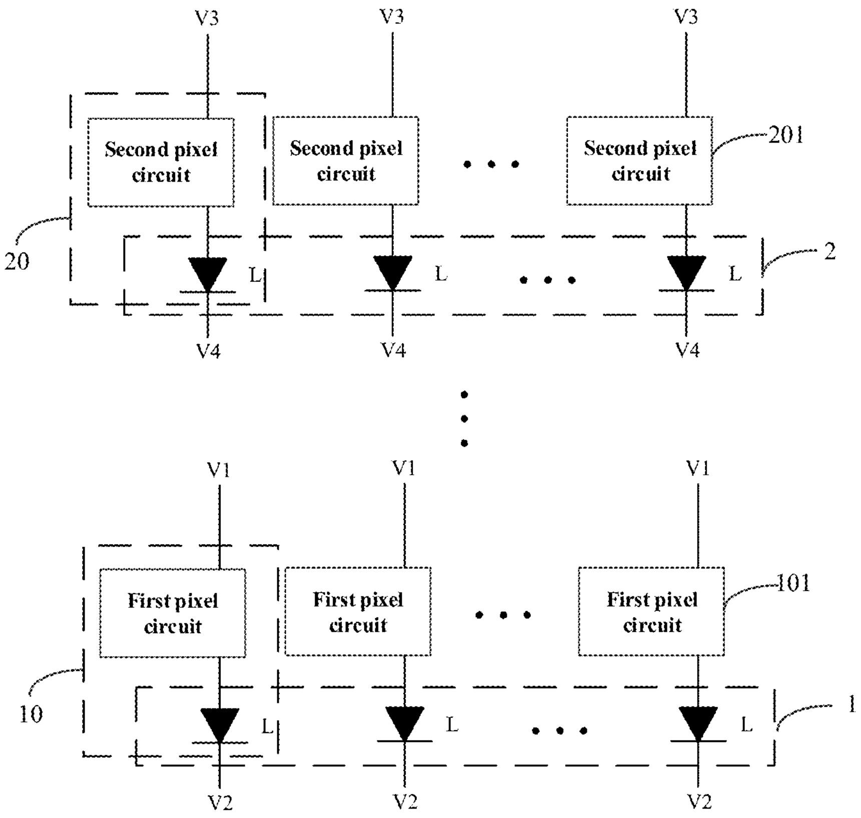
FIG. 1 is a schematic structural view of a display panel according to an embodiment of the present application.

100: Display panel; 1: First display area; 2: Second display area; 3: Third display area; 10: First pixel unit; 101: First pixel circuit; 20: Second pixel unit; 201: Second pixel circuit; 30: Third pixel unit; 301: Third pixel circuit; L: Light-emitting element; PV1: First power supply signal line; PV2: Second power supply signal line; PV3: Third power supply signal line; PV4: Fourth power supply signal line; Seg1: First line segment; Seg2: Second line segment; Seg3: Third line segment; Seg4: Fourth line segment; Frame1: First side frame; Frame2: Second side frame; Frame3: Third side frame; 40: Driving circuit; VSR: Shift register unit; VGH1: First high-level signal; VGL1: First low-level signal; IC1: First integrated chip; IC2: Second integrated chip; IC3: Third integrated chip; IC4: Fourth integrated chip.

DETAILED DESCRIPTION

The features and exemplary embodiments of various aspects of the present application will be described in detail below. In order to make the purpose, technical solutions and advantages of the present application more clear, the present application will be further described in detail below with reference to the accompanying drawings and specific embodiments. It should be understood that the specific embodiments described herein are only intended to explain the present application, but not to limit the present application. It will be apparent to a person skilled in the art that the present application may be practiced without some of these specific details. The following description of the embodiments is merely to provide a better understanding of the present application by illustrating examples of the present application.

It should be noted that, in this document, relational terms such as first and second are used only to distinguish one entity or operation from another entity or operation, and do not necessarily require or imply such actual relationship or sequence between these entities or operations. Moreover, the terms "comprising", "including" or any other variation thereof are intended to encompass a non-exclusive inclusion such that a process, method, article or device that includes a list of elements includes not only those elements, but also includes other elements that are not explicitly listed but inherent to such a process, method, article or device. Without further limitation, an element defined by the term "comprising . . . " does not preclude presence of additional elements in a process, method, article or device that includes the element.

It should be noted that the embodiments in the present application and the features of the embodiments may be combined with each other in the case of no conflict. The embodiments will be described in detail below with reference to the accompanying drawings.

A display panel is composed of multiple pixel circuits and multiple light-emitting elements arranged in arrays. A pixel circuit is generally composed of a thin film transistor (TFT) and a capacitor. With the development of the display technology, different areas in the display panel are often configured to implement different functions. In different areas of the display panel, colors of light emitted by light-emitting elements, distribution densities of light-emitting elements, and the number of light-emitting elements driven by a pixel circuit may be different.

When devices in the different areas of the display panel are configured differently, in order to ensure uniformity of final display effects of the display panel, different display areas need to be configured and adjusted separately.

However, the separate adjustments performed on different display areas in the related art cannot ensure that the display effects of the different display areas can be uniform, thereby affecting display uniformity of the display panel.

In order to solve the above technical problems, embodiments of the present application provide a display panel, an integrated chip component and a display device. The display panel provided by embodiments of the present application is first described below.

FIG. 1 illustrates a schematic structural view of a display panel according to an embodiment of the present application. The display panel includes a first display area 1, a second display area 2 and pixel circuits.

The pixel circuits include first pixel circuits 101 and second pixel circuits 201. The first pixel circuits 101 may be configured to provide driving currents for light-emitting elements L in the first display area 1. The second pixel circuits 201 may be configured to provide driving currents for light-emitting elements L in the second display area 2.

The display panel further includes first pixel units 10 and second pixel units 20. The first pixel unit 10 includes a first pixel circuit 101 and a light-emitting element L connected to the first pixel circuit 101. The second pixel unit 20 includes a second pixel circuit 201 and a light-emitting element L connected to the second pixel circuit 201.

Figure 2:
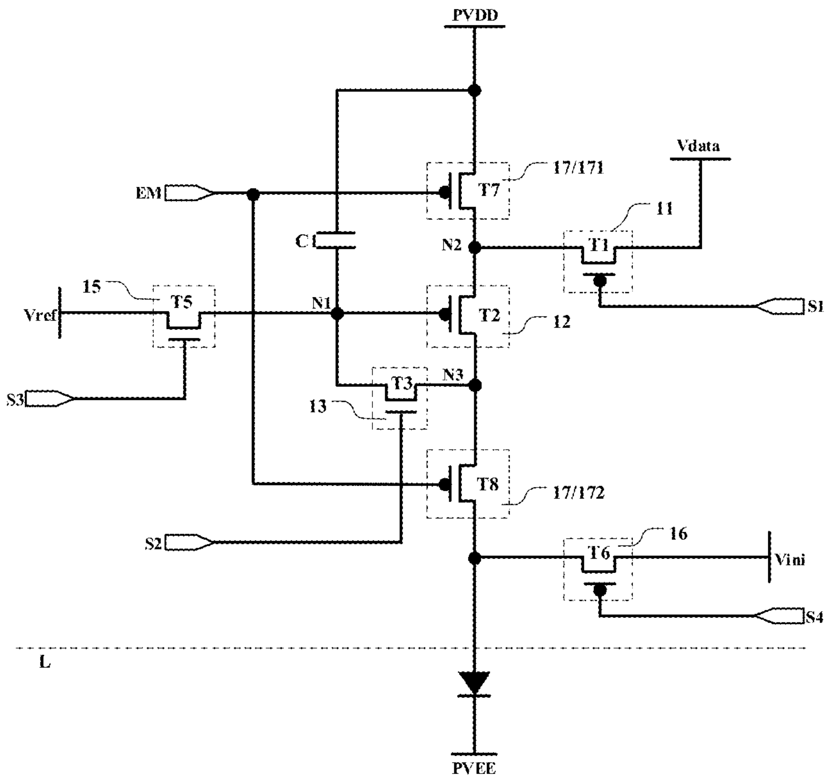
FIG. 2 is a schematic view of a pixel circuit according to an embodiment of the present application.
Figure 3:
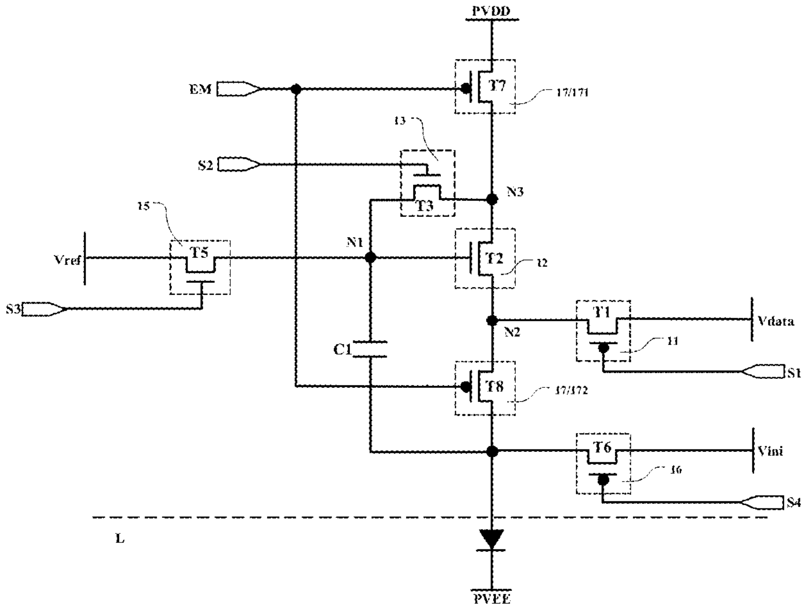
FIG. 3 is a schematic view of another pixel circuit according to an embodiment of the present application.
Figure 4:
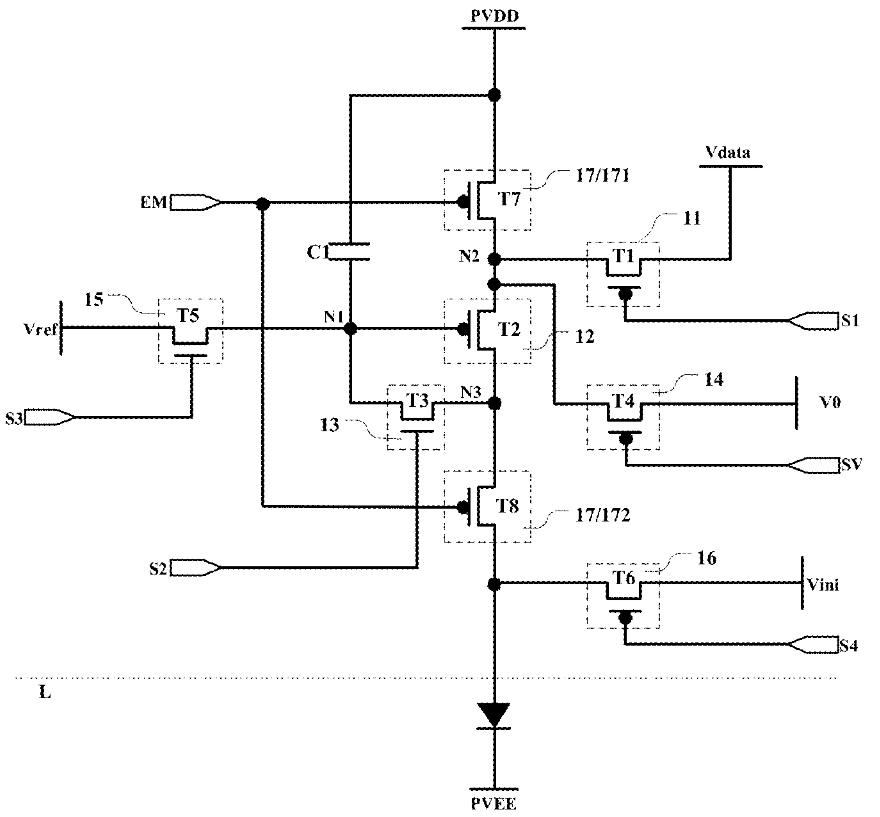
FIG. 4 is a schematic view of yet another pixel circuit according to an embodiment of the present application.
Figure 5:
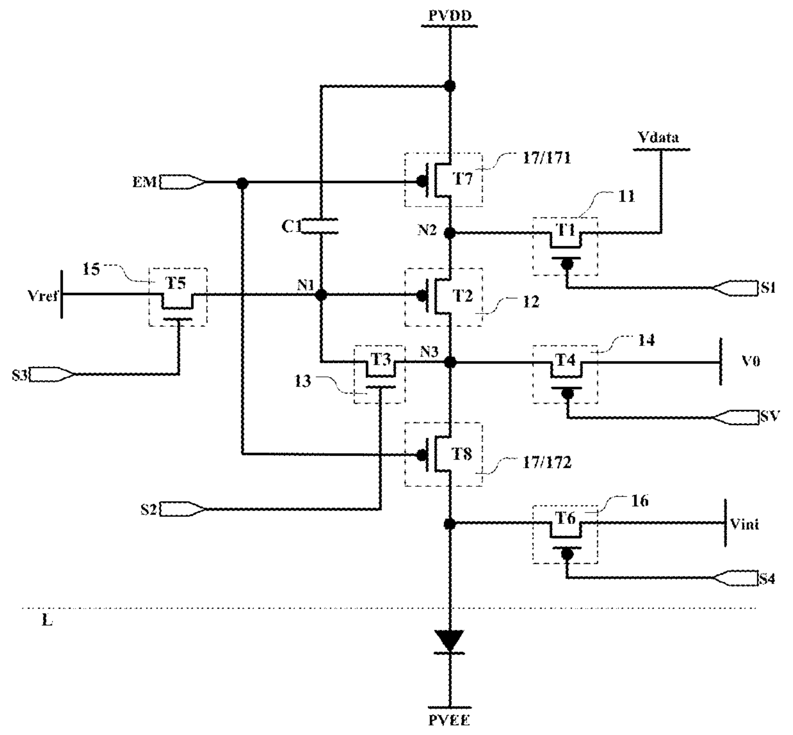
FIG. 5 is a schematic view of yet another pixel circuit according to an embodiment of the present application.
Figure 6:
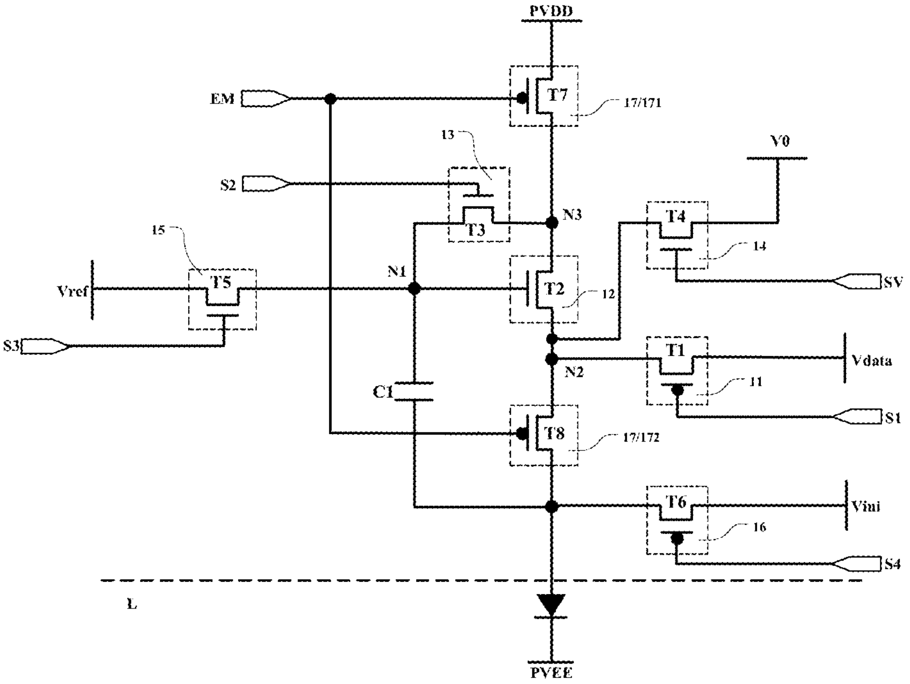
FIG. 6 is a schematic view of yet another pixel circuit according to an embodiment of the present application.
Figure 7:
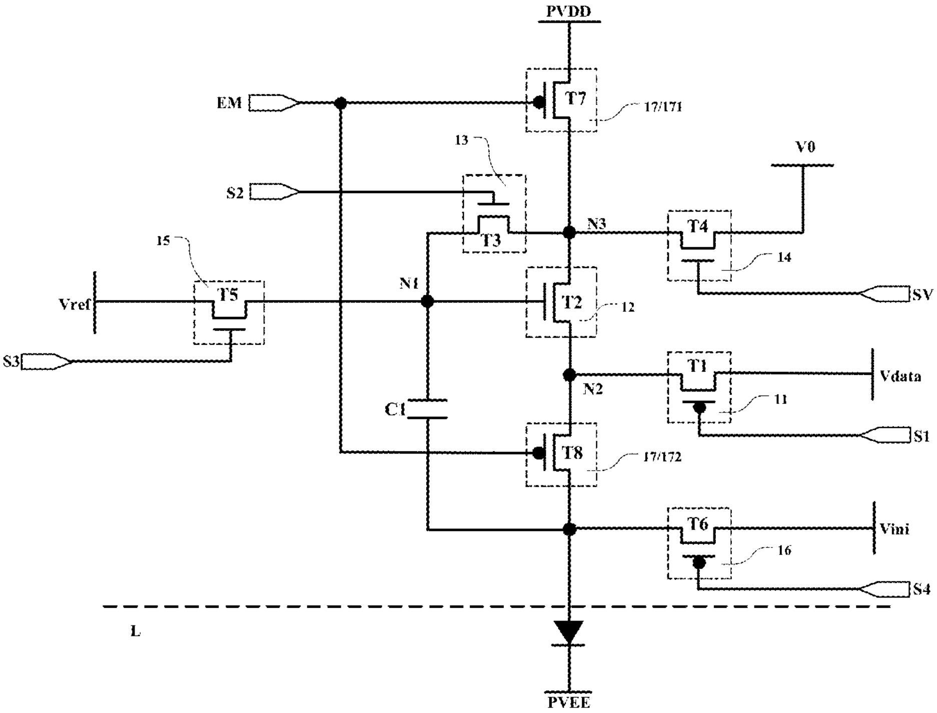
FIG. 7 is a schematic view of yet another pixel circuit according to an embodiment of the present application.

Optionally, reference is made to FIG. 2 to FIG. 7. FIG. 2 is a schematic view of a pixel circuit according to an embodiment of the present application. FIG. 3 is a schematic view of another pixel circuit according to an embodiment of the present application. FIG. 4 is a schematic view of yet another pixel circuit according to an embodiment of the present application. FIG. 5 is a schematic view of yet another pixel circuit according to an embodiment of the present application. FIG. 6 is a schematic view of yet another pixel circuit according to an embodiment of the present application. FIG. 7 is a schematic view of yet another pixel circuit according to an embodiment of the present application. The pixel circuit provided by embodiments of the present application includes a data writing module 11, a driving module 12, and a compensating module 13. The driving module 12 includes a driving transistor T2 configured to provide driving currents for light-emitting elements L of the display panel 100. The data writing module 11 is connected to a first electrode (i.e., a node N2) of the driving transistor T2 and is configured to provide data signals for the driving transistor T2. The compensating module 13 is connected between a gate of the driving transistor (i.e., a node N1) and a second electrode (i.e., a node N3) and is configured to compensate a threshold voltage of the driving transistor T2.

In addition, the pixel circuit may further include: a resetting module 15 configured to provide a reset signal Vref for the gate of the driving transistor T2; an initializing module 16 configured to provide an initialization signal Vini for the light-emitting element L; a emission controlling module 17 configured to selectively allow the light-emitting element L to enter a light-emitting stage. Optionally, the emission controlling module 17 includes a first emission controlling module 171 and a second emission controlling module 172. The first emission controlling module 171 is connected between a first power supply signal end and an electrode of the driving transistor T2. The second emission controlling module 172 is connected between another electrode of the driving transistor T2 and the light-emitting element L.

Optionally, in this embodiment, a control end of the data writing module 11 is configured to receive a first scanning signal S1 controlling an ON/OFF state of the data writing module 11. A control end of the compensating module 13 is configured to receive a second scanning signal S2 controlling an ON/OFF state of the compensating module 13. A control end of the resetting module 15 is configured to receive a third scanning signal S3 controlling an ON/OFF state of the resetting module 15. A control end of the initializing module 16 is configured to receive a fourth scanning signal S4 controlling an ON/OFF state of the initializing module 16. A control end of the emission controlling module 17 is configured to receive an emission controlling signal EM controlling an ON/OFF state of the emission controlling module 17.

In addition, optionally, in this embodiment, the data writing module 11 includes a data writing transistor T1. The first scanning signal S1 is for controlling an ON/OFF state of the data writing transistor T1. The compensating module 13 includes a compensating transistor T3. The second scanning signal S2 is for controlling an ON/OFF state of the compensating transistor T3. The resetting module 15 includes a resetting transistor T5. The third scanning signal S3 is for controlling an ON/OFF state of the resetting transistor T5. The initializing module 16 includes an initializing transistor T6. The fourth scanning signal S4 is for controlling an ON/OFF state of the initializing transistor T6. The first emission controlling module 171 includes a first emission controlling transistor T7. The second emission controlling module 172 includes a second emission controlling transistor T8. The emission controlling signal EM is for controlling ON/OFF states of the first emission controlling transistor T7 and the second emission controlling transistor T8.

It should be noted that, as shown in FIG. 4 to FIG. 7, the pixel circuit may further include a bias adjusting module 14 configured to provide a bias adjusting signal for the driving transistor T2. Optionally, as shown in FIG. 4 and FIG. 6, the bias adjusting module 14 is connected to the first electrode (i.e., the node N2) of the driving transistor T2; as shown in FIG. 5 and FIG. 7, the bias adjusting module 14 is connected to the second electrode (i.e., node N3) of the driving transistor T2. Optionally, a control end of the bias adjusting module 14 is configured to receive a bias adjustment control signal SV controlling an ON/OFF state of the bias adjusting module 14. The bias adjusting module 14 includes a bias adjusting transistor T4. The bias adjustment control signal SV is for controlling an ON/OFF state of the bias adjusting transistor T4.

In addition, it should be noted that, in the pixel circuits as shown in FIG. 2, FIG. 4, and FIG. 6, the driving transistor T2 is a PMOS transistor. The pixel circuit further includes a storage capacitor C1. A first electrode of the storage capacitor C1 is connected to the first power supply signal end. A second electrode of the storage capacitor C1 is connected to the gate of the driving transistor T2 for storing a signal transmitted to the gate of the driving transistor T2. In the pixel circuits as shown in FIG. 3, FIG. 5 and FIG. 7, the driving transistor T2 is an NMOS transistor. The pixel circuit further include a storage capacitor C1. A first electrode of the storage capacitor C1 is connected to the light-emitting element L. A second electrode of the storage capacitor C1 is connected to the gate of the driving transistor T2 for storing a signal transmitted to the gate of the driving transistor T2.

In this embodiment, the pixel unit is configured to receive power supply signals PVDD and PVEE and generate a driving current through a potential difference between the power supply signals PVDD and PVEE, thereby driving the light-emitting element to emit light. The positive power supply signal described below may be the PVDD signal, and the negative power supply signal described below may be the PVEE signal.

In addition, FIG. 2 to FIG. 7 only provide structures of some pixel circuits as examples, but not all structures are included therein. Any other pixel circuit whose supply signals PVDD and PVEE satisfying the limitations of the present application is within the protection scope of the embodiments of the present application, and will not detailed in this application.

The first pixel unit 10 may be configured to receive a first power supply signal V1 and a second power supply signal V2, where V1>V2. That is to say, the first power supply signal V1 may be a positive power supply signal, and the second power supply signal V2 may be a negative power supply signal. The first pixel circuit 101 in the first pixel unit 10, when driven by the first power supply signal V1 and the second power supply signal V2, may be configured to provide the driving current for the light-emitting element L connected to the first pixel circuit 101, so that light is emitted by the light-emitting element L.

The second pixel unit 20 may be configured to receive the third power supply signal V3 and the fourth power supply signal V4, where V3>V4. That is to say, the third power supply signals V3 may be the positive power supply signals, and the fourth power supply signals V4 may be the negative power supply signals. Driven by the third power supply signals V3 and the fourth power supply signals V4, the second pixel circuits 201 in the second pixel units 20 may be configured to provide the driving currents for the light-emitting elements L connected to the second pixel circuits 201, so that the light-emitting elements L emit light.

For the above first power supply signal V1, the second power supply signal V2, the third power supply signal V3 and the fourth power supply signal V4, signal voltages of these power supply signals may be set to satisfy the following formula:

$$|V1-V3|+|V2-V4|\neq 0.$$

According to the above formula, when at least one of the two conditions of V1≠V3 or V2≠V4 is satisfied, the value of |V1−V3|+|V2−V4| may not be 0. That is to say, with the limitation that the first power supply signal V1 is different from the third power supply signal V3 or the second power supply signal V2 is different from the fourth power supply signal V4, the high-level power supply signals received by the first pixel circuit 10 may be different from the high-level power supply signal received by the second pixel circuit 20, and/or, the low-level power supply signal received by the first pixel circuit 10 may be different from the low-level power supply signal received by the second pixel circuit 20. Since the different display areas in the panel often are required to have different display functions, in this application, the power supply signals in the different display areas are adjusted separately, so that desired display effects of the different display areas are ensured when display requirements of the two display areas are different for implementing the different functions.

In some embodiments, the signal voltages of these power supply signals described above may be further limited as satisfying $|V1-V2| \neq |V3-V4|$.

$|V1-V2|$ is a voltage difference between the first power supply signal V1 and the second power supply signal V2 received by the first pixel unit 10. The first power supply signal V1 and the second power supply signal V2 in the display panel may be the PVDD signal and the PVEE signal, respectively. Two ends of the light-emitting element L are connected to the PVDD signal and the PVEE signal, respectively, and may drive the light-emitting element L to emit light when driven by the PVDD signal and the PVEE signal. Similarly, $|V3-V4|$ is a voltage difference between the third power supply signal V3 and the fourth power supply signal V4 received by the second pixel unit 20.

By adjusting the signal voltages of the above power supply signals, the voltage difference received by the first pixel unit 10 is not equal to the voltage difference received by the second pixel unit 20, so that PVDD-PVEE signals with different voltage differences can be applied to the first pixel unit 10 and the second pixel unit 20, and therefore the voltage differences of the light-emitting elements L in the first display area 1 can be adjusted separately, or the voltage differences of the light-emitting elements L in the second display area 2 can be adjusted separately, and thus the PVDD-PVEE signals in the different display areas can be adjusted flexibly.

It can be understood that, the above condition $|V1-V2| \neq |V3-V4|$, which the signal voltages of the power supply signals are limited as satisfying, may be $|V1-V2|>|V3-V4|$, or $|V1-V2|<|V3-V4|$.

When $|V1-V2|>|V3-V4|$, it means that the voltage difference between the two power supply signals received by the first pixel unit 10 is greater than the voltage difference between the PVDD-PVEE signals received by the second pixel unit 20. When $|V1-V2|<|V3-V4|$, it means that the voltage difference between the two power supply signals received by the first pixel unit 10 is less than the voltage difference between the PVDD-PVEE signals received by the second pixel unit 20.

Figure 8:
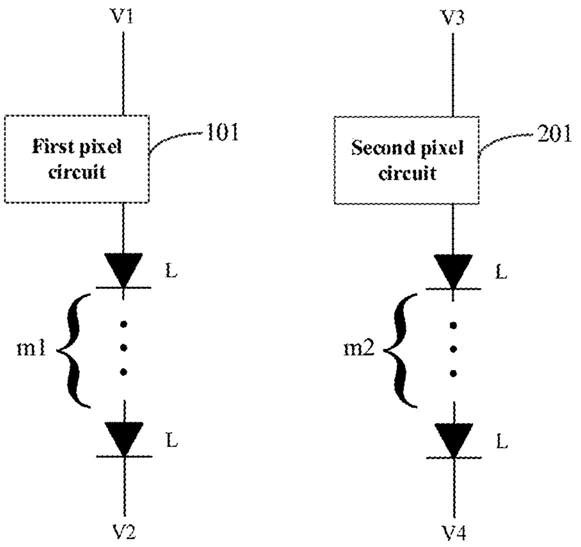
FIG. 8 is a schematic structural view of a display panel according to another embodiment of the present application.

With reference to FIG. 8, in some embodiments, in the first display area 1, each first pixel circuit 101 may be configured to provide driving currents for m1 light-emitting elements L. In the second display area 2, each second pixel circuit 201 may be configured to provide driving currents for m2 light-emitting elements L, where $m1 \geq 1$, $m2 \geq 1$, and $m1<m2$. The signal voltages of the power supply signals satisfy $|V1-V2|<|V3-V4|$.

It can be understood that, when m1 or m2 is set to be 1, it means that each pixel circuit is configured to drive one light-emitting element L. When m1 or m2 is set to be greater than or equal to 2, it means that each pixel circuit needs to drive multiple light-emitting elements L.

When $m1<m2$, it means that the number of light-emitting elements L driven by the first pixel circuit 101 is less than the number of light-emitting elements L driven by the second pixel circuit 201. For example, the first display area 1 may include an active area (AA) area, and the second display area 2 may include a camera under panel (CUP) area. A device such as a front camera is usually arranged under the CUP area. There are certain requirements on a transmittance of the CUP area, to enable the device such as the front camera to receive light. In order to ensure a desired transmittance of a light-transmitting area in the CUP area, an area of light-shielding structures such as the pixel circuits are usually reduced. For example, each pixel circuit in the CUP area is controlled to drive more light-emitting elements L, thereby reducing the density of the pixel circuits in the CUP area and improving the transmittance of the light-transmitting area. That is to say, the number of light-emitting elements L driven by each pixel circuit in the CUP is generally more than the number of light-emitting elements L driven by each pixel circuit in the AA area.

When the number m2 of light-emitting elements L driven by the second pixel circuit 201 is more than the number ml of light-emitting elements L driven by the first pixel circuit 101, since more light-emitting elements L are driven by the second pixel circuit 201, the driving current required to be provided by the second pixel circuit 201 should be greater than the driving current required to be provided by the first pixel circuit 101, to keep the brightness of the light-emitting elements L driven by the two types of pixel circuits close.

Figure 9:
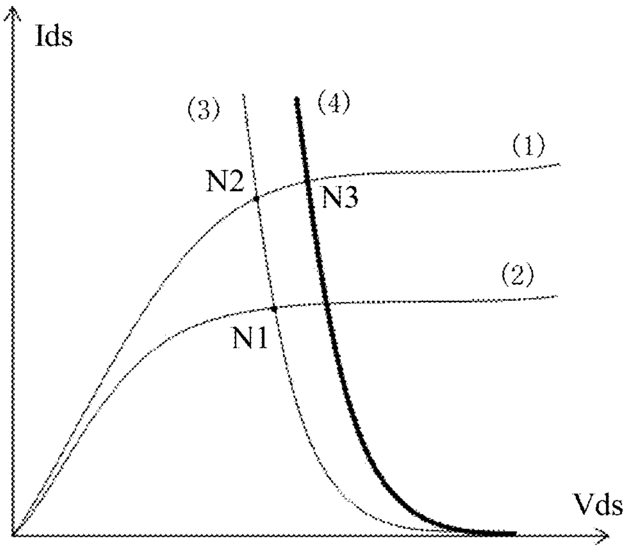
FIG. 9 is an Id–Vd curve of a driving transistor in an embodiment of the present application.

When the driving current flowing through the driving transistor in the pixel circuit increases, the voltage difference Vgs between the gate and the source of the driving transistor also increases. As shown in FIG. 9, the curve (1) and the curve (2) are the Ids-Vds curves of the driving transistor of the pixel circuit. The curve (1) is the Ids-Vds curve corresponding to a driving transistor with a relatively great Vgs, and the curve (2) is the Ids-Vds curve corresponding to the driving transistor with a relatively small Vgs. The curve (3) is an EL curve when the voltage difference between the positive power supply signal PVDD and the negative power supply signal PVEE is relatively small, the curve (4) is an EL curve when the voltage difference between the positive power supply signal PVDD and the negative power supply signal PVEE is relatively great. N1 means that when the Vgs of the driving transistor is relatively small and the voltage difference between the positive and negative power supply signals is relatively small, the driving transistor may operate in the saturation zone. N2 means that the voltage difference between the positive and negative power supply signals remain unchanged and the Vgs of the driving transistor increases, the operating zone of the driving transistor is liable to move from the saturation zone to the linear zone, which affects the conduction amplitude of the driving transistor and causes the brightness of light-emitting element L to change.

When the driving current in the driving transistor increases, in order to make the driving transistor continue to work in the saturation zone, the Ids-Vds curve (3) need to be moved to the right side in FIG. 9, so that the driving transistor re-operates in the saturation zone, thereby the driving transistor can be kept away from manufacture process fluctuations and device process fluctuations (which may cause problems such as life reduction). That is to say, N3 means that when the Vgs of the driving transistor increases, the curve (3) is moved to the right to the curve (4) by increasing the voltage difference between the positive and negative power supply signals, so that the operating zone of the driving transistor returns from the linear zone to the saturation zone.

There is a corresponding relation between the Ids-Vds curve of the driving transistor and the voltage difference between the two ends of the driving transistor. When the voltage difference between the two ends of the driving transistor increases, the Ids-Vds curve moves to the right. The greater the voltage difference is, the greater the extent of the curve moving to the right is. As shown in FIG. 9, when the Ids-Vds curve (3) is moved to the right to curve (4) by increasing the voltage difference between two ends of the driving transistor, the driving transistor can continue to operate in the saturation zone even when the Vgs of the driving transistor increases.

In some embodiments, the number m1 of the light-emitting elements L driven by the first pixel circuit 101 and the number m2 of the light-emitting elements L driven by the second pixel circuit 201 may be limited as satisfying at least one of the following two formulas:

$$|V3-V1|/|V1|<(m2-m1)/m1;$$

$$|V4-V2|/|V2|<(m2-m1)/m1.$$

The above (m2−m1)/m1 is a ratio of the number of light-emitting elements L that can be driven more by the second pixel circuit 201 than the first pixel circuits 101 to the number of light-emitting elements L that can be driven by the first pixel circuit 101. In the adjustment of the driving current by changing the voltage difference Vgs between the gate and the source of the driving transistor and the detection of the number of the light-emitting elements L that can be driven by the corresponding driving current, it can be determined that the number of the light-emitting elements L that can be driven by the pixel circuit can be increased by increasing the voltage difference Vgs. However, the number of the light-emitting elements L that can be driven is merely positive correlation with, but not is linearly related to the voltage difference Vgs, where a variation of Vgs is smaller than a variation of the light-emitting elements L that can be driven by the pixel circuit. That is to say, in the increasing of the number of the light-emitting elements L that can be driven by the pixel circuit, in order to prevent power consumption rising of the display panel due to an overly large variation of the signal voltage of the power supply signal, the variation of the third power supply signal V3 relative to the first power supply signal V1 may be limited as being less than the variation of m2 relative to m1. That is to say, |V3−V1/|V1|<(m2−m1)/m1.

Similarly, in order to prevent the overly large variation of the signal voltage of the power supply signal, the variation of the fourth power supply signal V4 relative to the second power supply signal V2 is limited as being less than the variation of m2 relative to ml. That is to say, |V4−V2|/|V2|<(m2−m1)/m1.

In some embodiments, in order to prevent the overly large variation of the signal voltage of the power supply signal, the signal voltage of the power supply signal may be limited as satisfying:

$$(|V3-V4|-|V1-V2|)/|V1-V2|<(m2-m1)/m1.$$

|V3−V4| is the voltage difference received by the second pixel circuit 201. |V1−V2| is the voltage difference received by the first pixel circuit 101. The above formula means that the variation of the voltage difference received by the second pixel circuit 201 relative to the voltage difference received by the first pixel circuit 101 is less than the variation of m2 relative to m1.

In some embodiments, the number m1 of the light-emitting elements L driven by the first pixel circuit 101 may be 1, and the number m2 of the light-emitting element L driven by the second pixel circuit 201 may be 2, 3 or 4. That is to say, each first pixel circuit 101 in the first display area 1 may be configured to drive one light-emitting element L, and the number of the light-emitting elements L driven by each second pixel circuit 201 in the second display area 2 may be two to four.

With the configuration that multiple light-emitting elements L is driven by each second pixel circuit 201, the number of the second pixel circuits 201 disposed in the second display area 2 may be reduced. Therefore, a layout area of the pixel circuits may be reduced and the transmittance of the light-transmitting area in the second display area 2 may be increased, so that the second display area 2 and the first display area 1 can implement different functions.

In some embodiments, when each first pixel circuit 101 in the first display area 1 is configured to provide driving currents for m1 light-emitting elements L, light emitted by the m1 light-emitting elements L is of a same color.

For light-emitting elements L that are configured to emit light of different colors, the required driving currents are usually different. When the first pixel circuit 101 is configured to provide driving currents for the m1 light-emitting elements L, the m1 light-emitting elements L may set to be light-emitting elements L that are configured to emit light of a same color, to keep the brightness of the m1 light-emitting elements L close to one another, so as to prevent the case where light-emitting elements L emitting light of different colors emit light with brightness difference under a same driving current. For example, the colors of light emitted by the m1 light-emitting elements L may each be red, blue, or green.

Similarly, for the second display area 2, when each second pixel circuit 201 is configured to provide driving currents for the m2 light-emitting elements L, light emitted by the m2 light-emitting elements L may be set to be of the same color. That is to say, the colors of light emitted by the m2 light-emitting elements L driven by a same second pixel circuit 201 may each be red, blue or green.

It can be understood that, when driving currents required by light-emitting elements L emitting light of different colors are the same or similar, a same pixel circuit may be configured to drive multiple light-emitting elements L emitting light of different colors.

In some embodiments, the first display area 1 may include a first area. A distribution density of light-emitting elements L in the first area may be set as ρ1. The second display area 2 may include a second area. A distribution density of light-emitting elements L in the second area may be set as ρ2. ρ2|<|ρ2, and the signal voltages of the power supply signals satisfy |V1−V2|<|V3−V4|.

The distribution density of light emitting elements L in at least a part of the first display area 1 is ρ1, and the distribution density of the light emitting elements L in at least a part of the second display area 2 is ρ2. By setting that ρ1<ρ2, the distribution density of light-emitting elements L in the first area may be less than the distribution density of the light-emitting elements L in the second area, so that the first area and the second area can implement different functions. For example, when the second display area 2 includes a transmitting area for implementing a function of under-screen camera, light-emitting elements in the second display area 2 are disposed in an island pattern. Light-emitting elements are densely arranged on the island, and no light-emitting elements are disposed in the transmitting area. As such, the density of light-emitting elements is relatively high in a partial area of the second display area 2, but the distribution density of light-emitting elements in the entire second display area 2 is relatively low due to the transmitting area.

In the above case, by setting $|V1-V2|<|V3-V4|$, even when the transmitting area is disposed in second display area and a driving current of the driving transistor in each pixel circuit in the second area is greater than the driving current for the light-emitting element L in the first area, the driving transistor of the pixel unit in the second area can operate in the saturation zone when the driving current increases, because the voltage difference $|V3-V4|$ received by the pixel circuit in the second area is still greater than the voltage difference $|V1-V2|$ received by the pixel circuit in the first area. Therefore, when the second display area includes the transmitting area, a desired display effect of the second display area can still be ensured.

In some embodiments, the signal voltages of the above power supply signals, when satisfying $|V1-V2|<|V3-V4|$, may further be limited as satisfying at least one of the following formulas:

$$0<V1<V3; \text{ and}$$

$$V4<V2<0.$$

The first power supply signal V1 and the third power supply signal V3 are positive power supply signals. The second power supply signal V2 and the fourth power supply signal V4 are negative power supply signals.

With the setting where each of the signal voltages of the first power supply signal V1 and the third power supply signal V3 is greater than zero and the first power supply signal V1 is less than the third power supply signal V3, that is to say, $0<V1<V3$, the voltage difference between the third power supply signal V3 and the fourth power supply signal V4 may be greater than the voltage difference between the first power supply signal V1 and the second power supply signal V2, that is to say, $|V1-V2|<|V3-V4|$.

With the setting where each of the signal voltages of the second power supply signal V2 and the fourth power supply signal V4 is less than zero and the second power supply signal V2 is greater than the fourth power supply signal V4, that is to say, $V4<V2<0$, the voltage difference between the third power supply signal V3 and the fourth power supply signal V4 may be greater than the voltage difference between the first power supply signal V1 and the second power supply signal V2, that is to say, $|V1-V2|<|V3-V4|$.

In addition, when the above two formulas are satisfied at the same time, that is to say, when $0<V1<V3$ and $V4<V2<0$ are satisfied at the same time, the voltage difference between the first power supply signal V1 and the second power supply signal V2 are bound to be less than the voltage difference between the third power supply signal V3 and the fourth power supply signal V4, that is to say $|V1-V2|<|V3-V4|$.

In some embodiments, the signal voltages of the above power supply signals may be further limited as satisfying the following formula:

$$|V1-V3|+|V2-V4|<|V1-V2|.$$

$|V1-V3|$ is the voltage difference between the first power supply signal V1 and the third power supply signal V3, that is the signal difference between the positive power supply signals received by the two pixel circuits. $|V2-V4|$ is the voltage difference between the second power supply signal V2 and the fourth power supply signal V4, that is, the signal difference between the negative power supply signals received by the two pixel circuits. $|V1-V2|$ is the signal difference between two power supply signals received by the first pixel circuit 101.

$|V1-V3|+|V2-V4|$ may be expressed as a sum of the variations of the two power supply signals received by the second pixel circuit 201 relative to their corresponding two power supply signals received by the first pixel circuit 101. It may be limited that the sum of the variations of the two power supply signals should be less than the signal difference between the two power supply signals in the first pixel circuit 101, to prevent power consumption rising of the display panel due to overly large variations of the signal voltages of the power supply signals. That is to say, in the adjustment of the power supply signals in the first pixel circuit 101 and the second pixel circuit 201, adjusting the signal voltages of the power supply signals by a large amount should be avoided. Instead, on the premise that display effects of the light-emitting elements in the first display area 1 and the second display area 2 are uniform, the variations of the signal voltages of the power supply signals are reduced so that the power consumption of the display panel is reduced.

It can be understood that, the sum of the variations of the two power supply signals received by the second pixel circuit 201 relative to their corresponding two power supply signals received by the first pixel circuit 101 (i.e., $|V1-V3|+|V2-V4|$) should not only be less than the signal difference between the two power supply signals in the first pixel circuit 101, but also less than the signal difference between the two power supply signals in the second pixel circuit 201, that is to say, $|V1-V3|+|V2-V4|<|V1-V2|$ and $|V1-V3|+|V2-V4|<|V3-V4|$ should be satisfied at the same time. For the embodiments described above where it is already limited that $|V1-V2|<|V3-V4|$, only the condition that the value of $|V1-V3|+|V2-V4|$ is less than the less one of the signal differences (that is, $|V1-V3|+|V2-V4|<|V1-V2|$) is required to be further satisfied.

Figure 10:
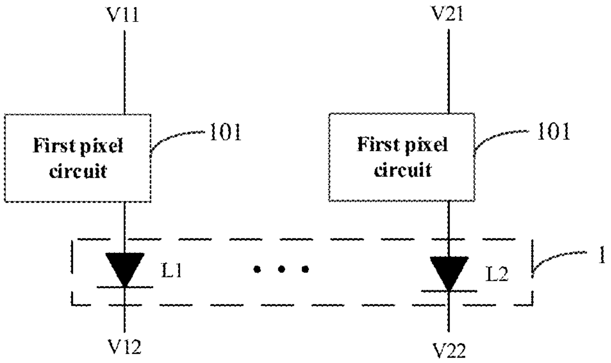
FIG. 10 is a schematic structural view of a display panel according to yet another embodiment of the present application.
Figure 11:
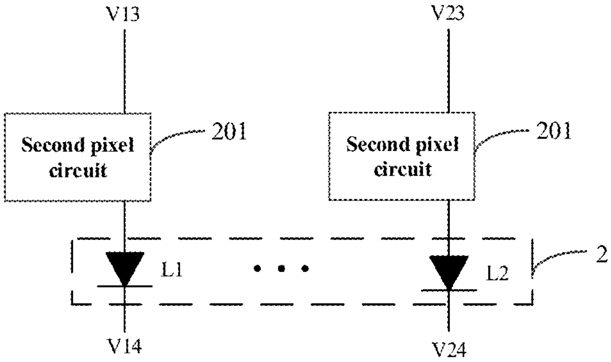
FIG. 11 is a schematic structural view of a display panel according to yet another embodiment of the present application.

With reference to FIG. 10 and FIG. 11, L1 is a light-emitting element L emitting light of a first color, and L2 is a light-emitting element L emitting light of a second color. In some embodiments, as shown in FIG. 10, in the first display area 1 described above, the first power supply signal received by the light-emitting element L emitting light of the first color is V11 and the second power supply signal received by the light-emitting element L emitting light of the first color is V12, the first power supply signal received by the light-emitting element L emitting light of the second color is V21 and the second power supply signal received by the light-emitting element L emitting light of the second color is V12. As shown in FIG. 11, in the second display area 2, the third power supply signal received by the light-emitting element L emitting light of the first color is V13 and the fourth power supply signal received by the light-emitting element L emitting light of the first color is V14, the third power supply signal received by the light-emitting element L emitting light of the second color is V23 and the fourth power supply signal received by the light-emitting element L emitting light of the second color is V24. The signal voltages of the above power supply signals may be limited as satisfying at least one of $|V11-V12|\neq|V21-V22|$ or $|V13-V14|\neq|V23-V24|$.

Since voltage differences between power supply signals required by light-emitting elements L emitting light of different colors are different, when the first display area 1 and the second display area 2 require different power supply signals, differences between the power supply signals received by the pixel units corresponding to the light-emitting elements emitting light of different colors are different. Therefore, when the variations of the power supply signals received by the pixel units corresponding to the light-emitting elements emitting light of different colors are adjusted separately, the light-emitting elements emitting light of different colors can achieve desired display effects in both of the first display area and the second display area.

When $|V11-V12|\neq|V21-V22|$, it means that the signal difference between the power supply signals received by the light-emitting element L emitting light of the first color is different than the signal difference between the power supply signals received by the light-emitting element L emitting light of the second color. With the separate adjustments of the signal voltages of the power supply signals corresponding to the light-emitting elements L emitting light of the two colors, separate adjustments of the brightness of the light-emitting elements L emitting light of different colors can be achieved, which results in that the light-emitting elements L emitting light of different colors in the first display area 1 can each achieve desired display effects.

Similarly, when $|V13-V14|\neq|V23-V24|$, it means that, in the second display area 2, the signal difference between the power supply signals received by the light-emitting element L emitting light of the first color and the signal difference between the power supply signals received by the light-emitting element L emitting light of the second color are different. With the separate adjustments of the light-emitting elements L emitting light of different colors, the light-emitting elements L emitting light of different colors in the second display area 2 can each achieve desired display effects.

In the above embodiment, the signal voltages of the above power supply signals may be further limited as satisfying:

$$|V13-V11|+|V14-V12|\neq|V23-V21|+|V24-V22|.$$

$|V13-V11|$ is a signal variation between the positive power supply signals received by the light-emitting elements L emitting light of the first color in the two display areas respectively. $|V14-V12|$ is a signal variation between the negative power supply signals received by the light-emitting elements L emitting light of the first color in the two display areas respectively. $|V23-V21|$ is a signal variation between the positive power supply signals received by the light-emitting elements L emitting light of the second color in the two display areas respectively. $|V24-V22|$ is a signal variation between the negative power supply signals received by the light-emitting elements L emitting light of the first color in the two display areas respectively. Therefore, with the setting where the signal variations between the positive and negative power supply signals of the light-emitting elements L emitting light of one color in the two display areas is not equal to the signal variations between the positive and negative power supply signals of the light-emitting elements L emitting light of a different color in the two display areas, the light-emitting elements L emitting light of the one color in the different display areas can be separately adjusted from the light-emitting elements L emitting light of the different color in the different display areas by separately adjusting the power supply signals in each of the display areas.

In the above embodiments, the first color may be red or green and the second color may be blue, and then the signal voltages of the above power supply signals may be limited as satisfying:

$$|V13-V11|+|V14-V12|<|V23-V21|+|V24-V22|.$$

In the display panel, for the light-emitting elements L emitting red, green or blue light, a driving current and a turn-on voltage required by the light-emitting element L emitting blue light are greater than driving currents and turn-on voltages required by the light-emitting elements L emitting light of other colors. With the setting where the sum of the signal variation between the positive power supply signals and the signal variation between the negative power supply signals in the light-emitting element L emitting blue light is greater than the sum of the signal variation between the positive power supply signals and the signal variation between the negative power supply signals in each of the light-emitting elements L emitting light of other colors, the light-emitting element L emitting blue light can receive the positive and negative power supply signals with greater voltage differences, thereby ensuring the uniformity of the display effects of the light-emitting elements L emitting light of different colors.

Figure 12:
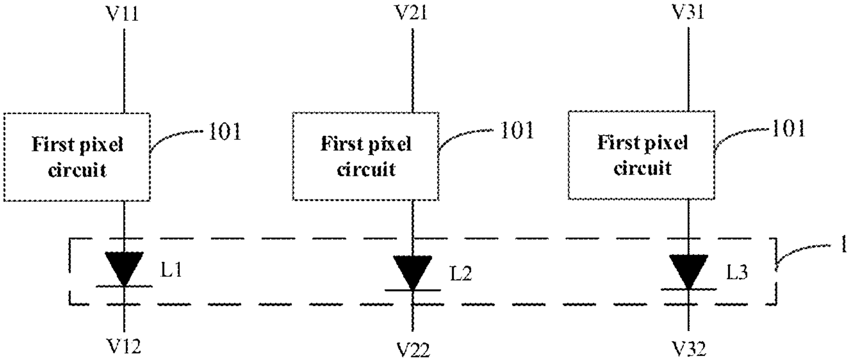
FIG. 12 is a schematic structural view of a display panel according to yet another embodiment of the present application.
Figure 13:
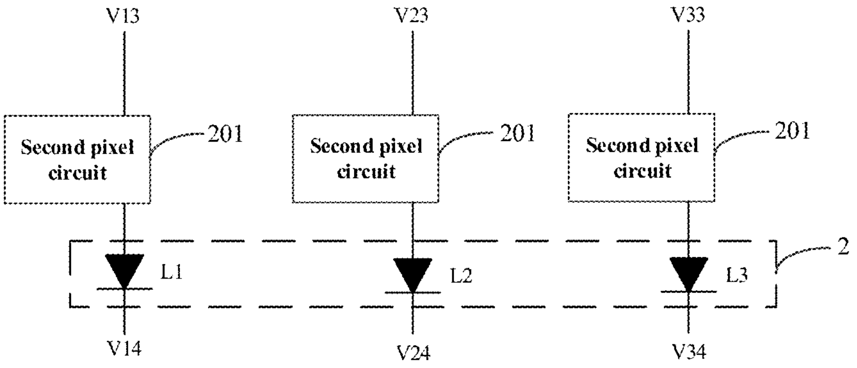
FIG. 13 is a schematic structural view of a display panel according to yet another embodiment of the present application.

With reference to FIG. 12 and FIG. 13, L3 is a light-emitting element L emitting light of a third color. In the above embodiments, in the first display area 1, the first power supply signal received by the light-emitting element L emitting light of the third color is V31, and the second power supply signal received by the light-emitting element L emitting light of the third color is V32. In the display area 2, the third power supply signal received by the light-emitting element L emitting light of the third color is V33, and the fourth power supply signal received by the light-emitting element L emitting light of the third color is V34. Then, for the light-emitting elements L emitting light of the three different colors, the signal voltages of the power supply signals corresponding to the light-emitting elements L emitting light of the three different colors may be limited as satisfying at least one of the following two conditions:

(1) that at least one of $|V11-V12|\neq|V31-V32|$ and $|V13-V14|\neq|V33-V34|$ is satisfied; and (2) that at least one of $|V21-V22|\neq|V31-V32|$ and $|V23-V24|\neq|V33-V34|$ is satisfied.

In condition (1), $|V11-V12|$ and $|V31-V32|$ are the signal difference between the power supply signals received by the light-emitting element L emitting light of the first color and the signal difference between the power supply signals received by the light-emitting element L emitting light of the third color in the first display area 1, respectively. $|V13-V14|$ and $|V33-V34|$ are the signal difference between the power supply signals received by the light-emitting element L emitting light of the first color and the signal difference between the power supply signals received by the light-emitting element L emitting light of the third color in the second display area 2, respectively.

When $|V11-V12|\neq|V31-V32|$, it means that, in the first display area 1, the voltage difference between the power supply signals received by the light-emitting element L emitting light of the first color and the voltage difference between the power supply signals received by the light-emitting element L emitting light of the third color are different, that is to say, the turn-on voltage of the light-emitting element L emitting light of the first color and the turn-on voltage of the light-emitting element L emitting light of the third color are different.

When $|V13-V14|\neq|V33-V34|$, it means that, in the second display area 2, the turn-on voltage of the light-emitting element L emitting light of the first color and the turn-on voltage of the light-emitting element L emitting light of the third color are different.

In condition (2), |V21−V22| and |V31−V32| are the signal difference between the power supply signal received by the light-emitting element L emitting light of the second color and the signal difference between the power supply signals received by the light-emitting element L emitting light of the third color in the first display area 1, respectively. |V23−V24| and |V33−V34| are the signal difference between the power supply signals received by the light-emitting element L emitting light of the second color and the signal difference between the power supply signals received by the light-emitting element L emitting light of the third color in the second display area 2, respectively.

When |V21−V22|≠|V31−V32|, it means that, in the first display area 1, the turn-on voltage of the light-emitting element L emitting light of the second color and the turn-on voltage of the light-emitting element L emitting light of the third color are different.

When |V23−V24|≠|V33−V34|, it means that, in the second display area 2, the turn-on voltage of the light-emitting element L emitting light of the second color and the turn-on voltage of the light-emitting element L emitting light of the third color are different.

In the above embodiments, the signal voltages of the power supply signals may further be limited as satisfying at least one of the following formulas:

$$|V13-V11|+|V14-V12|\neq|V33-V31|+|V34-V32|;$$

$$|V23-V21|+|V24-V22|\neq|V33-V31|+|V34-V32|.$$

|V13−V11|+|V14−V12| is the sum of the signal variation between the positive power supply signals of the light-emitting element L emitting light of the first color in the first display area 1 and the second display area 2 respectively and the signal variation between the negative power supply signals of the light-emitting element L emitting light of the first color in the first display area 1 and the second display area 2 respectively. |V33−V31|+|V34−V32| is the sum of the signal variation between the positive power supply signals of the light-emitting element L emitting light of the third color in the first display area 1 and the second display area 2 respectively and the signal variation between the negative power supply signals of the light-emitting element L emitting light of the third color in the first display area 1 and the second display area 2 respectively. |V23−V21|+|V24−V22| is the sum of the signal variation between the positive power supply signals of the light-emitting element L emitting light of the second color in the first display area 1 and the second display area 2 respectively and the signal variation between the negative power supply signals of the light-emitting element L emitting light of the second color in the first display area 1 and the second display area 2 respectively.

With the setting where the variations of the positive and negative power supply signals of the light-emitting element L emitting light of the third color between the different display areas are different from the variations of the positive and negative power supply signals of the light-emitting element L emitting light of the first color or the second color between the different display areas, the signal difference between the power supply signals of the light-emitting element L emitting light of the third color and the signal difference between the power supply signals of the light-emitting element L emitting light of the first color can be adjusted separately. Therefore, for the light-emitting elements L emitting light of different colors, the signal difference between the power supply signals in the different display areas can be adjusted separately, to ensure the uniformity of the display effects of the light-emitting elements L emitting light of different colors in the different display areas.

In the above embodiments, the first color may be red, the second color may be blue, and the third color may be green. The signal voltages of the above power supply signals may satisfy at least one of the following formulas:

$$|V13-V11|+|V14-V12|\leq|V33-V31|+|V34-V32|;\text{ and}$$

$$|V23-V21|+|V24-V22|>|V33-V31|+|V34-V32|.$$

Since the turn-on voltage required by the light-emitting element L emitting red light when emitting light is relatively small, the turn-on voltage required by the light-emitting element L emitting blue light is relatively large. On the basis of the limitation |V13−V11|+|V14−V12|≠|V33−V31|+|V34−V32|, it is further limited that |V13−V11|+|V14−V12|≤|V33−V31|+|V34−V32|, which means that the variations of the positive and negative power supply signals of the light-emitting element L emitting red light between the different display areas is smaller than the variations of the positive and negative power supply signals of the light-emitting element L emitting green light between the different display areas, and the variations of the positive and negative power supply signals of the light-emitting element L emitting blue light between different display areas is greater than the variation of the positive and negative power supply signals of the light-emitting element L emitting green light between different display areas.

In some embodiments, the above second display area 2 may include the transmitting area. An operating process of the second display area 2 may include a light transmitting stage. At least in the light transmitting stage, the transmitting area may allow light to pass through the display panel.

The display area in the display panel may include an AA area, a CUP area, and the like. The second display area 2 may be the CUP area. Photosensitive devices such as an under-screen camera are usually disposed under the CUP area. The CUP includes the transmitting area, which may be configured to allow light to pass through the display panel to reach the photosensitive devices in the light transmitting stage.

In some embodiments, a color of light emitted by the light-emitting element L in the first display area 1 may be a fourth color, and a color of light emitted by the light-emitting element L in the second display area 2 may be a fifth color.

Light-emitting elements L emitting light of different colors may be disposed in the different display areas in the display panel respectively. Since the light-emitting elements L emitting light of different colors require different turn-on voltages when emitting light, with setting where the first power supply signal V1 is different from the third power supply signal V3 or the second power supply signal V2 is different from the fourth power supply signal V4, the voltage differences received by the light-emitting elements L in different display areas can be different. Therefore, the turn-on voltages of the light-emitting elements L emitting light of different colors in the different display areas can be adjusted separately, so that the light-emitting elements L emitting different colors can achieve uniform display effects under different voltage differences.

In the above embodiments, the fourth color may be red or green, the fifth color may be blue, and the signal voltages of the power supply signals may be limited as satisfying the following formula:

$$|V1-V2|<|V3-V4|.$$

Since the light-emitting elements L emitting light of different colors in the display panel have different requirements on the turn-on voltages. Under the condition that the driving currents are the same, a driving potential required by the light-emitting element L emitting blue light is usually greater than driving potentials required by other light-emitting elements L. Therefore, in order to ensure the display uniformity of the light-emitting elements L emitting light of different colors, the voltage difference between the positive and negative power supply signals received by the light-emitting element L emitting blue light should be greater than the voltage difference between the positive and negative power supply signals received by other light-emitting elements L, that is to say, $|V1-V2|<|V3-V4|$.

Figure 14:
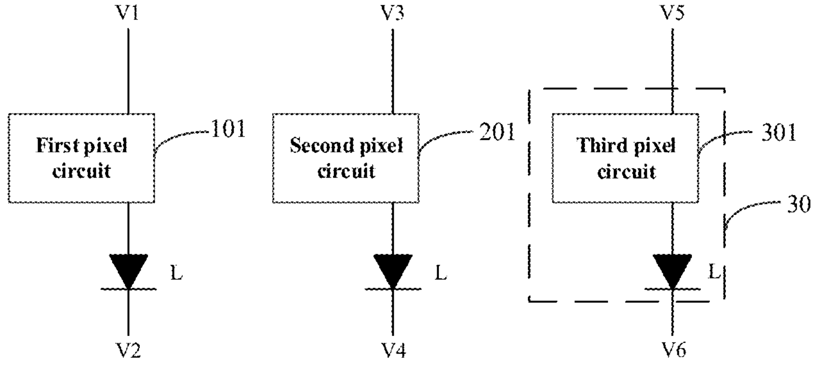
FIG. 14 is a schematic structural view of a display panel according to yet another embodiment of the present application.

With reference to FIG. 14, in the above embodiments, the display panel may further include a third display area 3, and a color of light emitted by the light-emitting element L in the third display area 3 may be a sixth color. The pixel circuits may further include third pixel circuits 301, and the third pixel circuits 301 may be configured to provide driving currents for the light-emitting elements L in the third display area 3. The display panel may further include third pixel units 30, and the third pixel unit 30 may include a third pixel circuit 301 and a light-emitting element L connected to the third pixel circuit 301.

The third pixel unit 30 is configured to receive a fifth power supply signal V5 and a sixth power supply signal V6, wherein V5>V6. That is to say, the fifth power supply signal V5 is the positive power supply signal, and the sixth power supply signal V6 is the negative power supply signal.

The signal voltages of the above power supply signals may be limited as satisfying at least one of the following formulas:

$$|V1-V5|+|V2-V6|\neq 0;$$

$$|V3-V5|+|V4-V6|\neq 0.$$

$|V1-V5|$ is the signal difference of the positive power supply signals between the light-emitting element L emitting light of the first color and the light-emitting element L emitting light of the third color. $|V2-V6|$ is the signal difference of the negative power supply signals between the light-emitting element L emitting light of the first color and the light-emitting element L emitting light of the third color. $|V3-V5|$ is the signal difference of the positive power supply signals between the light-emitting element L emitting light of the second color and the light-emitting element L emitting light of the third color, and $|V4-V6|$ is the signal difference of the negative power supply signals between the light-emitting element L emitting light of the second color and the light-emitting element L emitting light of the third color.

Since the light-emitting elements L emitting light of different colors have different device features and light-emitting materials, in order to make the light-emitting elements L emitting light of different colors have the same driving current to ensure the display uniformity under different colors, different turn-on voltages should be set for the light-emitting elements L emitting light of different colors separately, that is to say, the voltage differences between the positive and negative power supply signals of the light-emitting elements L emitting light of different colors are different. By setting that there are the positive power supply signal differences between different colors or the negative power supply signal differences between different colors, the voltage differences between the positive and negative power supply signals of the light-emitting elements L of each color may be adjusted separately, so that the light-emitting elements L emitting light of different colors reach the same driving current under different voltage differences.

In the above embodiments, the fourth color may be red, the fifth color may be blue, and the sixth color may be green. The signal voltages of each power supply signal above may be limited as satisfying at least one of the following formulas:

$$|V1-V2|\leq|V5-V6|;$$

$$|V5-V6|<|V3-V4|;$$

Wherein $|V1-V2|$ is the voltage differences between the positive and negative power supply signals received by the red light-emitting elements L, $|V3-V4|$ is the voltage differences between the positive and negative power supply signals received by the blue light-emitting elements L, and $|V5-V6|$ is the voltage differences between the positive and negative power supply signals received by the green light-emitting elements L.

The voltage differences between the positive and negative power supply signals required by the blue light-emitting elements L are the greatest when the light-emitting elements L of three colors maintain at the same driving current, then the voltage differences between the positive and negative power supply signals received by the blue light-emitting elements L may be limited to be the greatest among three voltage differences. And the voltage differences between the positive and negative power supply signals required by the red light-emitting elements L are slightly smaller than the voltage differences between the positive and negative power supply signals required by the green light-emitting elements L, the voltage differences between the positive and negative power supply signals received by the red light-emitting elements L may be limited to be not greater than the voltage differences between the positive and negative power supply signals received by the green light-emitting elements L.

By providing different driving potentials for the light-emitting elements L emitting light of different colors, the light-emitting elements L of three colors may have the same or similar driving current under different driving potentials, thereby ensure the uniformity of the display effects.

Figure 15:
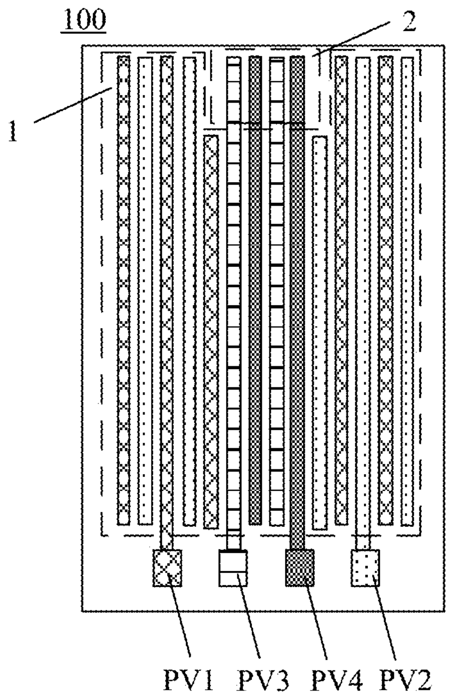
FIG. 15 is a schematic view of wiring of power supply signal line of a display panel according to an embodiment of the present application.

With reference to FIG. 15, in some embodiments, the above display panel 100 may include a first power supply signal line PV1 and a third power supply signal line PV3. The first power supply signal line PV1 may be configured to provide the first power supply signal V1 for the first pixel unit 10. The third power supply signal line PV3 may be configured to provide the third power supply signal V3 for the second pixel unit 20. Alternatively, the display panel 100 may include a second power supply signal line PV2 and a fourth power supply signal line PV4. The second power supply signal line PV2 may be configured to provide the second power supply signal V2 for the first pixel unit 10. The fourth power supply signal line PV4 may be configured to provide the fourth power supply signal V4 for the second pixel unit 20.

In the first display area 1 of the display panel 100, the first pixel units 10 may be arranged in arrays. The number of the first power supply signal lines PV1 may be set to correspond to the number of columns of the first pixel units 10. Each first power supply signal line PV1 may be electrically connected to multiple first pixel units 10 in a same column, to provide positive power supply signals for the light-emitting elements L in the first pixel units 10 in the column. Similarly, in the second display area 2, the second pixel units 20 may also be arranged in arrays. The number of the third power supply signal lines PV3 may be set to correspond to the number of columns of the second pixel units 10. Each third power supply signal line PV3 may be electrically connected to multiple second pixel units 20 on a same column, to provide positive power supply signals for the light-emitting elements L in the third pixel units 30 in the column.

Similarly, in the first display area 1, the number of the second power supply signal lines PV2 and the number of the fourth power supply signal lines PV4 may be set to correspond to the number of columns of the first pixel units 10 and the number of columns of the second pixel units 20, respectively. Each second power supply signal line PV2 may be configured to provide the negative power supply signals for the light-emitting elements L in multiple first pixel units 10 in a same column. Each fourth power supply signal line PV4 may be configured to provide the negative power supply signals for the light-emitting elements L in multiple second pixel units 20 in a same column.

Figure 16:
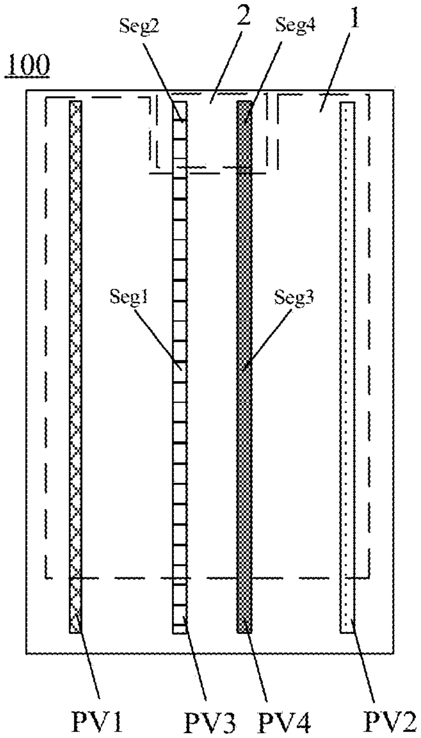
FIG. 16 is a schematic view of wiring of power supply signal line of a display panel according to another embodiment of the present application.

With reference to FIG. 16, in the above embodiments, a signal voltage on the first power supply signal line PV1 and a signal voltage on the third power supply signal line PV3 may be set to be different signal voltages, that is to say, V1≠V3.

The third power supply signal line PV3 may include a first line segment Seg1 and a second line segment Seg2. The first line segment Seg1 is located in the first display area 1. The second line segment Seg2 is located in the second display area 2. That is to say, as the third power supply line extends to the second display area 2 in the display panel 100, the third power supply line passes through the first display area 1.

Figure 17:
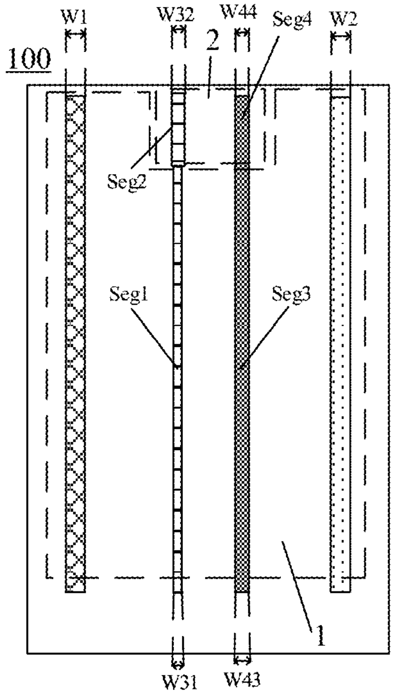
FIG. 17 is a schematic view of wiring of power supply signal line of a display panel according to yet another embodiment of the present application.

As shown in FIG. 17, in the third power supply signal line PV3, a width of the first line segment Seg1 may be W31. A width of the first power supply signal line PV1 may be W1. The first line segment Seg1 of the third power supply signal line PV3 and the first power supply signal line PV1 are located in the first display area 1. The first power supply signal line PV1 may be configured to provide the first power supply signal V1 for the first pixel units 10 in the first display area 1. The first line segment Seg1 of the third power supply signal line PV3 is not electrically connected to the pixel units in the first display area 1, but are electrically connected to the second pixel units 20 through the second line segment Seg2 located in the second display area 2, to provide the third power supply signal. That is to say, the first power supply signal line PV1 mainly play a role of providing the power supply signals, and the first line segment Seg1 mainly play a role of transmitting the power supply signals.

It can be understood that, when signal wiring is provided in the display panel 100, the signal wiring make the signal voltage change when transmitting the power supply signal. The voltage variation is related to the length and width of the signal wiring.

Since the third power supply signal line PV3 need to pass through the first display area 1 to enter the second display area 2, the length of the signal wiring of the third power supply signal line PV3 is different from wiring length of the first power supply signal line PV1. If a wiring width of the first power supply signal line PV1 is set to be the same as a wiring width of the third power supply signal line PV3, when their wiring lengths are different but the wiring widths are the same, voltage variations generated by the signal voltage of the power supply signal in the first power supply signal line PV1 and the third power supply signal line PV3 are different.

With the setting where the wiring width of the first line segment Seg1 of the third power supply signal line PV3 is different from the wiring width of the first power supply signal line PV1, that is to say, W31≠W1, the voltage variations generated in the process of transmission of the signal voltage of the power supply signal in the two power supply signal lines can be adjusted separately, so as to avoid a significant difference between the voltage variations generated by the different power supply signal lines.

Similarly, the signal voltage on the second power supply signal line PV2 may also be set to be different from the signal voltage on the fourth power supply signal line PV4, that is to say, V2≠V4.

The fourth power supply signal line PV4 may include a third line segment Seg3 and a fourth line segment Seg4. The third line segment Seg3 is located in the first display area 1. The fourth line segment Seg4 is located in the second display area 2. That is to say, as the fourth power supply signal line extends to the second display area 2 in the display panel 100, the fourth power supply signal line passes through the first display area 1.

Since the wiring length of the third power supply signal line PV3 is different from the wiring length of the fourth power supply signal line PV4. If the wiring width of the third power supply signal line PV3 is set to be the same as the wiring width of the fourth power supply signal line PV4, the voltage variations of the signal voltages of the two power supply signals generated in the process of transmission of the signals are different. With the setting where the wiring width of the third line segment Seg3 of the fourth power supply signal line PV4 is different from the wiring width of the first power supply signal line PV1, that is to say, W43≠W2, the voltage variations of the signal voltages of the two power supply signals generated in the process of transmission of the signals can be adjusted separately, so that the variation differences between the signal voltages of the two power supply signals in the process of transmission of the signals can be reduced.

In the above embodiments, the width of the first line segment Seg1 of the third power supply signal line PV3 may be limited to be less than the width of the first power supply signal line PV1, that is to say, W31<W1.

When the signal wiring are disposed in the display panel 100, the signal voltage variation of the power supply signals in the process of transmission of the signal is also related to a parasitic capacitance in the display panel 100. When the parasitic capacitor increases, the voltage variation will increase. The parasitic capacitance on the signal wiring is positive correlation with the width of the signal wiring. That is to say, the greater the width of the signal wiring is, the larger the generated parasitic capacitance is, and the less the width of the signal wiring, the less the parasitic capacitance generated will be.

In the first display area 1, the magnitude of the parasitic capacitance is related to the first power supply signal line PV1 and the first line segment Seg1 of the third power supply signal line PV3. Because the first power supply signal line PV1 directly provide the power supply signal for the first pixel unit 10, the width of the signal wiring needs to be increased. In order to prevent the total parasitic capacitance in the first display area 1 from being overly large, the wiring width of the first line segment Seg1 of the third power supply signal line PV3 may be reduced, that is to say, it is limited that W31<W1, to reduce the total parasitic capacitance in the first display area 1.

Similarly, in order to prevent the parasitic capacitance in the first display area 1 from being overly large, the width of the third line segment Seg3 of the fourth power supply signal line PV4 may also be limited to be less than the width of the second power supply signal line PV2, that is to say, W43<W2.

In some embodiments, the width of the first line segment Seg1 of the third power supply signal line PV3 may be limited to be greater than the width of the first power supply signal line PV1, that is to say, W31>W1.

Due to the wiring resistance on the signal wiring, in the process of the transmission of the power supply signal, the signal voltage of the power supply signal is reduced because of the influence of IR voltage drop. In addition, when the wiring length of the third power supply signal line PV3 is greater than length of the first power supply signal line PV1, the voltage drop magnitude of the third power supply signal V3 will be greater, so that third power supply signal V3 received by the second pixel unit 20 is small.

The wiring resistance of the signal wiring is positively correlation with the length of the signal wiring, and is negatively correlation with the width of the signal wiring. When the wiring length of the third power supply signal line PV3 is greater than length of the first power supply signal line PV1, the wiring width of the third power supply signal line PV3 may be increased, to reduce the influence of the IR voltage drop on the third power supply signal line PV3. The third power supply signal line PV3 includes the first line segment Seg1 and the second line segment Seg2. By increasing the wiring width of at least one of the first line segment Seg1 and the second line segment Seg2, the influence of the IR voltage drop on the third power supply signal line PV3 can be reduced. That is to say, the wiring width of the first line segment Seg1 may be limited to be greater than the width of the first power supply signal line PV1, W31>W1. The wiring width of the second line segment Seg2 may be limited to be greater than the width of the first power supply signal line PV1.

Similarly, since the wiring length of the fourth power supply signal line PV4 is greater than the wiring length of the second power supply signal line PV2, the wiring width of the third line segment Seg3 may be limited to be greater than the width of the second power supply signal line PV2, to reduce the influence of the IR voltage drop on the fourth power supply signal line PV4, W431>W2. The wiring width of the fourth line segment Seg4 may also be limited to be greater than the width of the second power supply signal line PV2.

In the above embodiments, the width of the second line segment Seg2 of the third power supply signal line PV3 may be W32, and the width of the fourth line segment Seg4 of the fourth power supply signal line PV4 may be W44.

For the third power supply signal line PV3, the width of the first line segment Seg1 of the third power supply signal line PV3 may be set to be different from the width of the second line segment Seg2, that is to say, W32≠W31.

When the width of the first line segment Seg1 is set to be greater than the width of the second line segment Seg2, that is to say, when W31>W32, it means that wiring resistance generated on the first line segment Seg1 is smaller than wiring resistance generated on the second line segment Seg2, but the parasitic capacitance generated by the area where the first line segment Seg1 is located is greater than the parasitic capacitance generated by the area where the second line segment Seg2 is located.

Similarly, when the width of the first line segment Seg1 is set to be less than the width of the second line segment Seg2, that is to say, when W31<W32, it means that the wiring resistance generated on the first line segment Seg1 is greater than the wiring resistance generated on the second line segment Seg2, but the parasitic capacitance generated by the area where the first line segment Seg1 is located is less than the parasitic capacitance generated by the area where the second line segment Seg2 is located.

Similarly, for the fourth power supply signal line PV4, the width of the third line segment Seg3 of the fourth power supply signal line PV4 may be set to be different from the width of the fourth line segment Seg4, that is to say, W44≠W43.

Specifically, when the width of the third line segment Seg3 is set to be less than the width of the fourth line segment Seg4, that is to say, when W43<W44, it means that the wiring resistance generated on the third line segment Seg3 is greater than the wiring resistance generated on the fourth line segment Seg4, but the parasitic capacitance generated by the area where the third line segment Seg3 is located is less than the parasitic capacitance generated by the area where the fourth line segment Seg4 is located. Similarly, when the width of the third line segment Seg3 is set to be greater than the width of the fourth line segment Seg4, that is to say, when W43>W44, it means that the wiring resistance generated on the third line segment Seg3 is less than the wiring resistance generated on the fourth line segment Seg4, but the parasitic capacitance generated by the area where the third line segment Seg3 is located is greater than the parasitic capacitance generated by the area where the fourth line segment Seg4 is located.

The widths of the two line segments in the third power supply signal line PV3 or the fourth power supply signal line PV4 may be configured according to actual functional requirements of the display panel 100, which are not limited herein.

In the above embodiments, the first line segment Seg1 and the second line segment Seg2 of the third power signal line PV3 may be disposed in the same layer, and the first line segment Seg1 and the first power supply signal line PV1 may also be disposed in the same layer. That is to say, the first power supply signal line PV1 and the third power supply signal line PV3 are located in the same metal layer.

Similarly, the third line segment Seg3 and the fourth line segment Seg4 of the fourth power supply signal line PV4 may be disposed in the same layer, and the third line segment Seg3 and the second power supply signal line PV2 may be disposed in the same layer. That is to say, the second power supply signal line PV2 and the fourth power supply signal line PV4 are located in the same metal layer.

In another embodiment, the first line segment Seg1 of the third power supply signal line PV3 and the first power supply signal line PV1 may be disposed in different layers.

Since the first line segment Seg1 of the third power supply signal line PV3 and the first power supply signal line PV1 are located in the first display area 1, when the first line segment Seg1 of the third power supply signal line PV3 and the first power supply signal line PV1 are disposed in different layers, the distance between the two power supply signal lines can be reduced, and even the first line segment Seg1 may intersect and overlap the first power supply signal line PV1 in the first display area 1, thereby significantly reducing the layout area of the two power supply signal lines and saving wiring space of the display panel 100.

On the basis that the first line segment Seg1 of the third power supply signal line PV3 and the first power supply signal line PV1 are disposed in different layers, the second line segment Seg2 of the third power supply signal line PV3 and the first line segment Seg1 may be disposed in the same layer, and the second line segment Seg2 of the third power supply signal line PV3 and the first power supply signal line PV1 may be disposed in the same layer.

When the second line segment Seg2 and the first line segment Seg1 are located in the same layer, the first line segment Seg1 may be electrically connected directly to the second line segment Seg2 in an area where the first display area 1 interfaces with the second display area 2. When the second line segment Seg2 and the first power supply signal line PV1 are located in the same layer, the first line segment Seg1 may be electrically connected to the second line segment Seg2 through a via in an area where the first display area 1 interfaces with the second display area 2.

Similarly, the third line segment Seg3 of the fourth power supply signal line PV4 and the second power supply signal line PV2 may be disposed in different layers. The fourth line segment Seg4 of the fourth power supply signal line Pv4 and the third line segment Seg3 and may be located in the same layer, or the fourth line segment Seg4 of the fourth power supply signal line Pv4 and the second power supply signal line PV2 may be located in the same layer.

When the third line segment Seg3 and the fourth line segment Seg4 are located in the same layer, the third line segment Seg3 may be electrically connected directly to the fourth line segment Seg4. When the third line segment Seg3 and the second power supply signal line PV2 are located in the same layer, the third line segment Seg3 and the fourth line segment Seg4 may be electrically connected through a via.

In the above embodiments, the first line segment Seg1 and the first power supply signal line PV1 may be disposed in different layers, and the second line segment Seg2 and the first power supply signal line PV1 may be disposed in different layers. When the first line segment Seg1 and the second line segment Seg2 are located in different layers from the first power supply signal line PV1, in the first display area 1, the distance between the first line segment Seg1 and the second line segment Seg2 may be reduced to save wiring space. In the area where the first display area 1 interfaces with the second display area 2, the second line segment Seg2 and the first power supply signal line PV1 are located in different layers, which may reduce the distance between the second line segment Seg2 and the first power supply signal line PV1 to save wiring space.

Similarly, the third line segment Seg3 and the second power supply signal line PV2 may be disposed in different layers, and the fourth line segment Seg4 and the second power supply signal line PV2 may be disposed in different layers.

Figure 18:
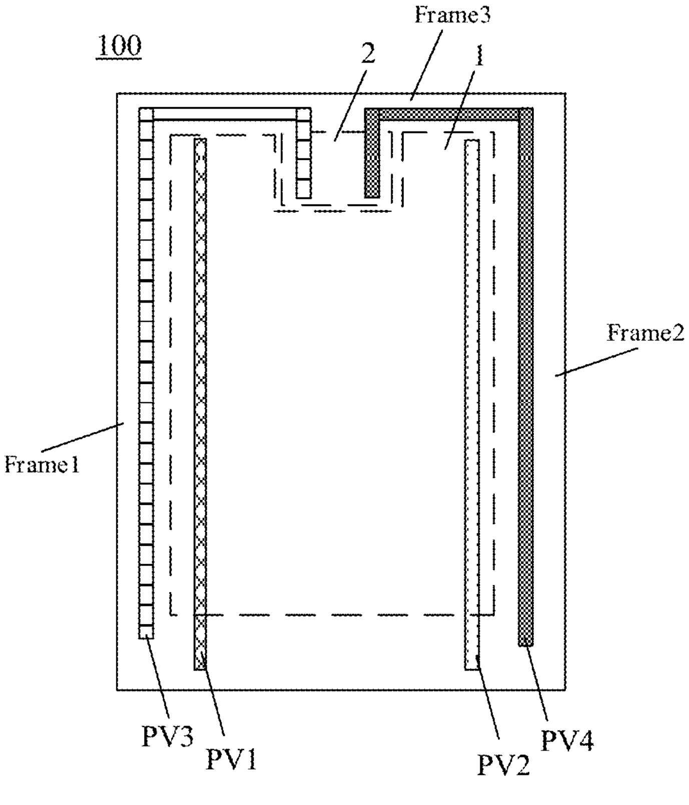
FIG. 18 is a schematic view of wiring of power supply signal line of a display panel according to yet another embodiment of the present application.

With reference to FIG. 18, in some embodiments, the display panel 100 may further include a first side frame Frame1, a second side frame Frame2 opposite to the first side frame Frame1, and a third side frame Frame3 adjoining to the first side frame Frame1 and the second side frame Frame2.

The third power supply signal line PV3 is at least partially located in at least one of the first side frame Frame1 and the second side frame Frame2. The third power supply signal line PV3 is at least partially located in the third side frame Frame3. The third power supply signal line PV3 may extend from the third side frame Frame3 to the second display area 2. The signal voltage of the first power supply signal line PV1 may be set to be different from the signal voltage of the third power supply signal line PV3, that is to say, V1≠V3.

It can be understood that, when a chip connected to the power supply signal line and providing the power supply signal is closer to the first display area 1, to provide the power supply signal for the second pixel unit 20 in the second display area 2, the third power supply signal line PV3 may extend to the second display area 2 by the passing through the first display area 1 or by bypassing the first display area 1.

As the third power supply signal line PV3 bypasses the first display area 1, the third power supply signal line PV3 may extend from the chip providing the power supply signal to at least one of the first side frame Frame1 or the second side frame Frame2, and continue to extend to the third side frame Frame3, and finally extend from the third side frame Frame3 to the second display area 2.

It can be understood that, multiple third power supply signal lines PV3 may each extend from the first side frame Frame1 to the third side frame Frame3 and enter the second display area 2. The multiple third power supply signal lines PV3 may extend from the second side frame Frame2 to the third side frame Frame3 and enter the second display area 2. Alternatively, a part of the third power supply signal line PV3 may extend from the first side frame Frame1 to the third side frame Frame3, and the other part of the third power supply signal line PV3 may extend from the second side frame Frame2 to the third side frame Frame3.

Similarly, for the fourth power supply signal line PV4, the signal voltage of the fourth power supply signal line PV4 may be different from the signal voltage of the second power supply signal line PV2, that is to say, V2≠V4. The fourth power supply signal line PV4 is at least partially located in at least one of the first side frame Frame1 or the second side frame Frame2. The fourth power supply signal line PV4 is at least partially located in the third side frame Frame3. The fourth power supply signal line PV4 may extend from the third side frame Frame3 to the second display area 2.

Figure 19:
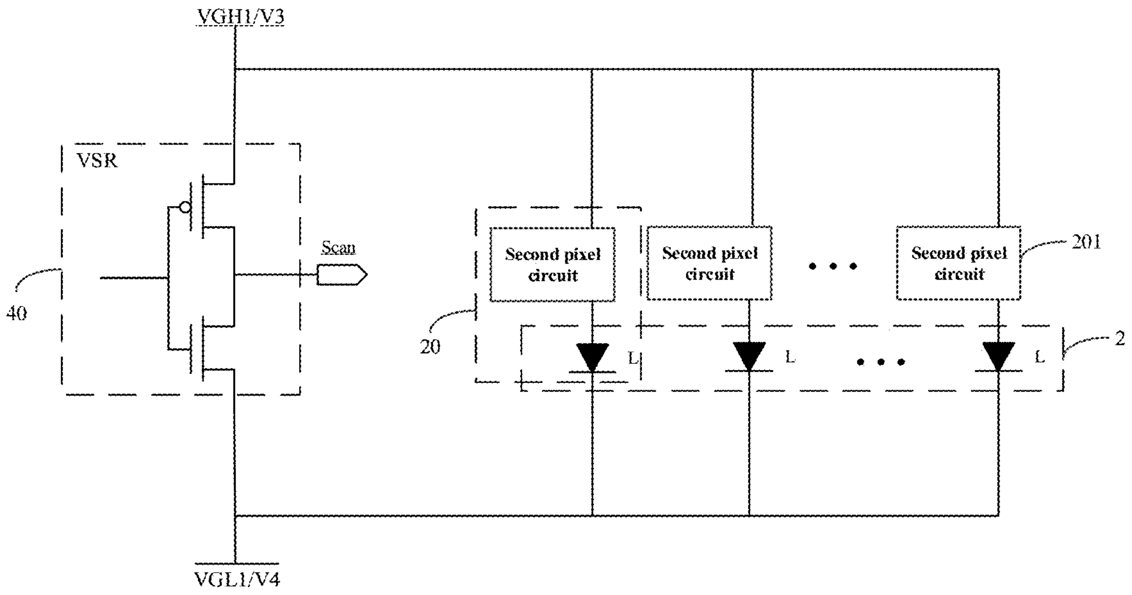
FIG. 19 is a schematic structural view of a circuit including a driving circuit and second pixel units according to yet another embodiment of the present application.

With reference to FIG. 19, as an optional embodiment, the display panel 100 described above may further include a driving circuit 40 which may be configured to provide a driving signal for a pixel circuit. The pixel circuit may be the first pixel circuit 101 or the second pixel circuit 201. The driving circuit 40 may be configured to receive a first high-level signals VGH1 and a first low-level signals VGL1, and generate the driving signal from the first high-level signal VGH1 and the first low-level signal VGL1.

In some embodiments, the first high-level signal VGH1 received by the driving circuit 40 may be the same as the third power supply signal V3 received by the second pixel unit 20.

The driving circuit 40 in the display panel 100 may be a shift register unit VSR disposed in a frame area of the display panel 100. A driving signal provided by the driving circuit 40 for the pixel circuit is a scan signal Scan outputted by the shift register unit VSR.

The shift register unit VSR may output corresponding scan signals to the pixel circuits in corresponding rows from the first high-level signal VGH1 and the first low-level signal VGL1. High and low levels of the scan signal correspond to the first high-level signal VGH1 and the first low-level signal VGL1, respectively. It can be understood that, the scan signals generated by the shift register unit VSR may be outputted to the pixel circuit in the first display area 1 or to the pixel circuit in the second display area 2, which is not limited herein.

In the first display area 1 and the second display area 2 of the display panel 100, in order to achieve separate adjustments of the power supply signals in the different display areas, the first power supply signal V1 may be set to be not equal to the third power supply signal V3, or the second power supply signal V1 may be set to be not equal to the fourth power supply signal V4.

When the first high-level signal VGH1 and the first low-level signal VGL1 received by the driving circuit 40 are not equal, the first high-level signal VGH1 may be reused as the third power supply signal V3, that is to say, the signal wiring of the first high-level signal VGH1 is connected to the second pixel unit 20 and provides the third power supply signal V3 for the second pixel unit 20. At this time, the third power supply signal V3 received by the second pixel unit 20 is not equal to the first power supply signal V1 received by the first pixel unit, and $|V1-V3|+|V2-V4|\neq 0$ is satisfied.

Correspondingly, in some embodiments, the first low-level signal VGL1 received by the driving circuit 40 may be the same as the fourth power supply signal received by the second pixel units 20.

When the first low-level signal VGL1 received by the driving circuit 40 is not equal to the second power supply signal V2 received by the driving circuit 40, the first low-level signals VGL1 may be reused as the fourth power supply signal V4, that is to say, the signal wiring of the first low-level signal VGL1 is connected to the second pixel unit 20 and provide the fourth power supply signal V4 for the second pixel unit 20. At this time, the fourth power supply signal V4 received by the second pixel unit 20 is not equal to the second power supply signal V2 received by the first pixel unit, and $|V1-V3|+|V2-V4|\neq 0$ is satisfied.

In some embodiments, the first high-level signal VGH1 is the same as the third power supply signal V3, and the first low-level signal VGL1 is the same as the fourth power supply signal.

When the first high-level signal VGH1 received by the driving circuit 40 and the first power supply signal V1 received by the first pixel unit are different, and the first low-level signal VGL1 received by the driving circuit 40 and the second power supply signal V2 received by the first pixel unit are different, the first high-level signal VGH1 may be taken as the third power supply signal V3 received by the second pixel unit 20, and the first low-level signal VGL1 may be taken as the fourth power supply signal received by the second pixel unit 20, so that the first power supply signal V1 is not equal to the third power supply signal V3, and the second power supply signal V2 is not equal to the fourth power supply signal V4.

It can be understood that, when in the display panel 100 there are high and low level signal voltages that are not exactly the same as the signal voltages of the first power supply signal V1 and the second power supply signal V2, the signal wiring of the high and low level signal voltage may be connected to the second pixel unit 20, and the high and low level signal voltages are reused as the third power supply signal V3 and the fourth power supply signal V4, respectively, so that while $|V1-V3|+|V2-V4|\neq 0$ is satisfied, the amount of signal wiring arranged in the display panel 100 is reduced and the wiring space of the display panel 100 is saved.

The embodiments of the present application further provide an integrated chip component providing signals for the display panel 100 in the above embodiments.

The integrated chip component may provide the first power supply signal V1 and the second power supply signal V2 for the first pixel unit 10, wherein V1>V2. That is to say, the integrated chip component may provide the positive power supply signal and the negative power supply signal for the first pixel unit 10, so that the light-emitting element L in the first pixel unit 10 emits light when driven by the positive and negative power supply signals.

Similarly, the integrated chip component may provide the third power supply signal V3 and the fourth power supply signal V4 for the second pixel unit 20, wherein V3>V4. That is to say, the integrated chip component can provide the positive power supply signal and the negative power supply signal for the second pixel unit 20, so that the light-emitting element L in the second pixel unit 20 emits light when driven by the positive and negative power supply signals.

The integrated chip component mentioned above may be configure to provide only the first power supply signal V1 and the second power supply signal V2; provide only the third power supply signal V3 and the fourth power supply signal V4; or provide all of the first power supply signal V1, the second power supply signal V1, the third power supply signal V3 and the fourth power supply signal V4.

The signal voltages of the above power supply signals may be limited as satisfying the following formula:

$$|V1-V3|+|V2-V4|\neq 0.$$

With the setting where at least one of the two conditions of V1≠V3 and V2≠V4 is satisfied, the first power supply signal V1 may be different from the third power supply signal V3, or the second power supply signal V2 may be different from the fourth power supply signals V4, so that driving voltage of the light-emitting element L in the first pixel unit 10 and driving voltage of the light-emitting element L in the second pixel unit 20 can be adjusted separately, to ensure the uniformity of the display effects of the two kinds of light-emitting elements L when the light-emitting elements L are configured differently to implement different functions.

Figure 20:
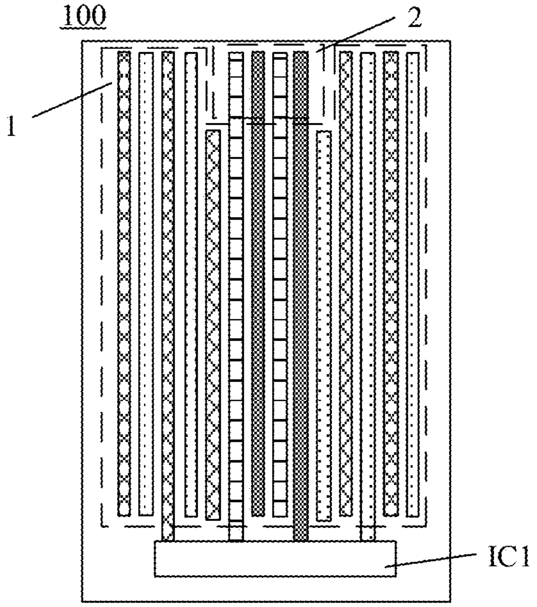
FIG. 20 is a schematic view of wiring of power signal lines of a display panel according to yet another embodiment of the present application.

With reference to FIG. 20, in the above embodiments, the integrated chip component may include a first integrated chip IC1. The first integrated chip IC1 may provide the first power supply signal V1 and the second power supply signal V2 for the first pixel unit 10, may provide the third power supply signal V3 and the fourth power supply signal V4 for the second pixel unit 20, and may provide all of the first power supply signal V1, the second power supply signal V2, the third power supply signal V3 and the fourth power supply signal.

It can be understood that, when the first integrated chip IC1 can provide the first power supply signal V1 and the second power supply signal V2, and can also provide the third power supply signal V3 and the fourth power supply signal V4, disposing the first integrated chip IC1 in the display panel 100 can achieve power supply signal outputs of the first pixel unit 10 and the second pixel unit 20.

Figure 21:
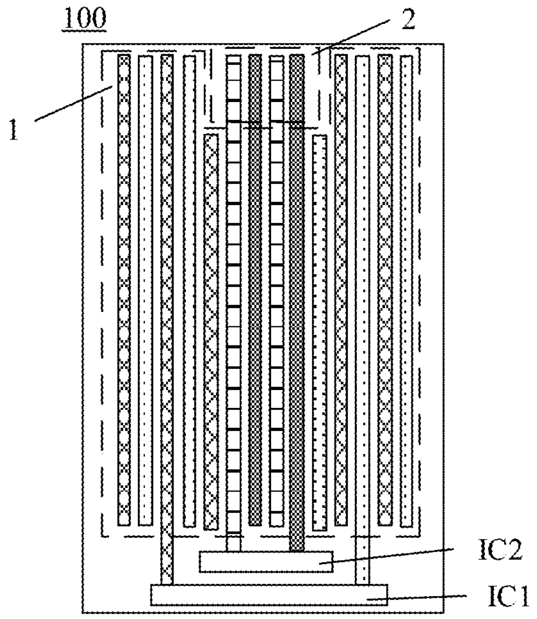
FIG. 21 is a schematic view of wiring of power supply signal line of a display panel according to yet another embodiment of the present application.

As shown in FIG. 21, in another embodiment, the integrated chip component may include a first integrated chip IC1 and a second integrated chip IC2.

The first integrated chip IC1 may provide the first power supply signal V1 and the second power supply signal V2 for the first pixel unit 10, wherein VI>V2. The second integrated chip IC2 may provide the third power supply signal V3 and the fourth power supply signal for the second pixel unit 20.

When the first integrated chip IC1 can provide the first power supply signal V1 and the second power supply signal V2, and the second integrated chip IC2 can provide the third power supply signal V3 and the fourth power supply signal V4, disposing the first integrated chip IC1 and the second integrated chip IC2 in the display panel 100 can achieve power supply signal outputs of the first pixel unit 10 and the second pixel unit 20.

Figure 22:
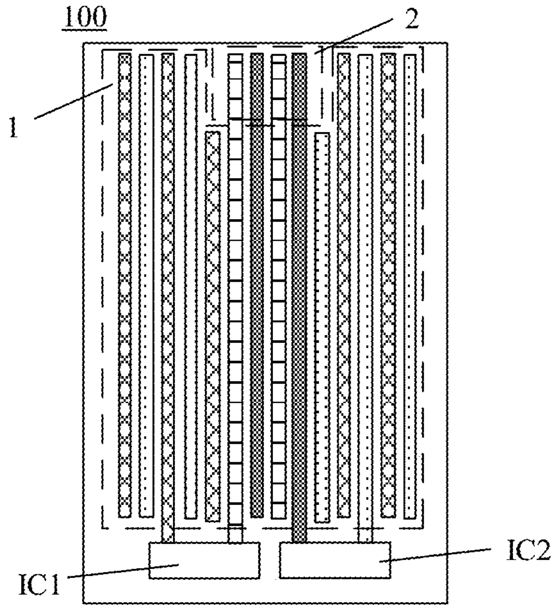
FIG. 22 is a schematic view of wiring of power supply signal line of a display panel according to yet another embodiment of the present application.

As shown in FIG. 22, in another embodiment, the integrated chip component may include a first integrated chip IC1 and a second integrated chip IC2.

The first integrated chip IC1 may provide the first power supply signal V1 for the first pixel unit 10 and the third power supply signal V3 for the second pixel unit 20, that is to say, the first integrated chip IC1 may provide the positive power supply signals for the two pixel units separately.

The second integrated chip IC2 may provide the second power supply signal V2 for the first pixel unit and the fourth power supply signal V4 for the second pixel unit 20, that is to say, the second integrated chip IC2 may provide negative power supply signals for the two pixel units separately.

When the first integrated chip IC1 can provide two kinds of positive power supply signals, and the second integrated chip IC2 can provide two kinds of negative power supply signals, disposing the first integrated chip IC1 and the second integrated chip IC2 in the display panel 100 may achieve the power supply signal outputs of the first pixel unit 10 and the second pixel unit 20.

Figure 23:
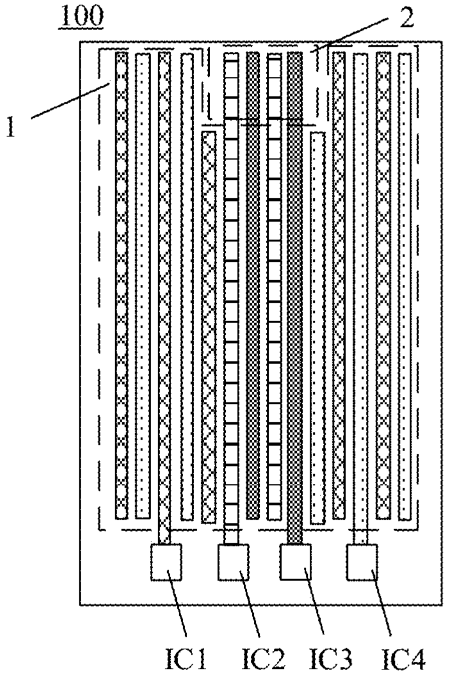
FIG. 23 is a schematic view of wiring of power supply signal line of a display panel according to yet another embodiment of the present application.

As shown in FIG. 23, in some embodiments, the integrated chip component mentioned above may include a first integrated chip IC1, a second integrated chip IC2, a third integrated chip IC3, and a fourth integrated chip IC4.

The first integrated chip IC1 may provide the first power signal V1 for the first pixel unit 10. The second integrated chip IC2 may provide the second power signal V2 for the first pixel unit 10. The third integrated chip IC3 may provide the third power supply signal V3 for the second pixel unit 20. The fourth integrated chip IC4 may provide the fourth power supply signal V4 for the second pixel unit 20.

Disposing the first integrated chip IC1, the second integrated chip IC2, the third integrated chip IC3, and the fourth integrated chip IC4 in the display panel 100 can achieve the power supply signal outputs of the first pixel unit 10 and the second pixel unit 20.

It can be understood that, in the adjustment that the voltage differences between the positive and negative power supply signals of the two kinds pixel units are set to be different, the negative power supply signals of the two kinds of pixel units may be set to be the same, and only the positive power supply signals are adjusted, that is to say, $V1 \neq V3$, $V2=V4$. Alternatively, the positive power supply signals of the two kinds of pixel units may be set to be the same, and only the negative power supply signals are adjusted, that is to say, $V1=V3$, $V2 \neq V4$.

When the positive power supply signals of the two kinds of pixel units are the same, or the negative power supply signals of the two kinds of pixel units are the same, a same integrated chip may be used to provide the positive power supply signals or the negative power supply signals for the two kinds of pixel units. For example, the first integrated chip IC1, the second integrated chip IC2, and the third integrated chip IC3 may be disposed in the display panel 100, and two of the three integrated chips provide positive power supply signals with different signal voltages (i.e., V1 and V3) for the two kinds of pixel units, respectively. Another integrated chip provides the same negative power supply signal (i.e., V2) for the two kinds of pixel units.

Figure 24:
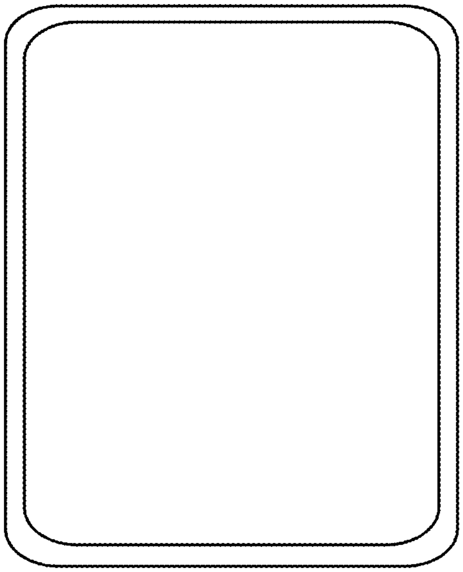
FIG. 24 is a schematic structural view of a display apparatus according to an embodiment of the present application.

The embodiments of the present application further provide a display apparatus. As shown in FIG. 24, the display apparatus may be a PC, a TV, a display, a mobile terminal, a tablet, a wearable device, etc. The display apparatus may include the display panel provided by the embodiments of the present application.

The functional blocks shown in the above-described structural block diagrams may be implemented as hardware, software, firmware, or a combination thereof. When implemented in hardware, it may be, for example, an electronic circuit, an application specific integrated circuit (ASIC), suitable firmware, a plug-in, a function card, or the like. When implemented in software, those elements of the present application are programs or code segments used to perform the required tasks. The program or code segments may be stored in a machine-readable medium or transmitted over a transmission medium or communication link by a data signal carried in a carrier wave. A "machine-readable medium" may include any medium that can store or transmit information. Examples of the machine-readable medium may include an electronic circuit, semiconductor memory device, ROM, flash memory, erasable ROM (EROM), floppy disk, CD-ROM, optical disk, hard disk, fiber optic medium, radio frequency (RF) link, and the like. The code segment may be downloaded via a computer network such as the Internet, an intranet, or the like.

It should be noted that, the terms "comprising", "including" or any other variation thereof in this document are intended to encompass non-exclusive inclusion, such that a process, method, article or device comprising a series of elements not only includes those elements, but also includes other elements which are not expressly listed but inherent to such a process, method, article or apparatus.

Specific examples are used herein to illustrate the principles and implementations of the present application, and the descriptions of the above examples are only used to help understanding of the methods and core concepts of the present application. The above descriptions are only made with respect to preferred embodiments of the present application. It should be pointed out that, due to limitation of written expressions, there are objectively unlimited specific structures. For a person skilled in the art, several improvements, modifications or changes can also be made without departing from the principles of the present application, and the above-mentioned technical features can be combined in an appropriate manner; these improvements, modifications, or combinations, or application of the technical solutions of the present application directly to other situation without improvement, shall be regarded as within a protection scope of the present application.

What is claimed is:

1. A display panel, comprising:

a first display area and a second display area;

pixel circuits comprising first pixel circuits and second pixel circuits, at least one of the first pixel circuits being connected to at least one of light-emitting elements in the first display area, and at least one of the second pixel circuits being connected to at least one of light-emitting elements in the second display area; and first pixel units and second pixel units, at least one of the first pixel units comprising a first pixel circuit and at least one light-emitting element connected to the first pixel circuit, and at least one of the second pixel units comprising a second pixel circuit and at least one light-emitting element connected to the second pixel circuit;

wherein at least one of the first pixel units comprises the light-emitting element emitting light of a first color, at least one of the second pixel units comprises the light-emitting element emitting light of a first color, and the first color is different from the second color, wherein at least one of the first pixel units is configured to receive a first power supply signal V1 and a second power supply signal V2, V1>V2; and at least one of the second pixel units is configured to receive a third power supply signal V3 and a fourth power supply signal V4, V3>V4;

wherein $|V1-V2| \neq |V3-V4|$;

in the first display area, a first power supply signal and a second power supply signal received by a light-emitting element emitting light of a first color are V11 and V12, respectively;

and a first power supply signal and a second power supply signal received by a light-emitting element emitting light of a second color are V21 and V22, respectively; and in the second display area, a third power supply signal and a fourth power supply signal received by a light-emitting element emitting light of a first color are V13 and V14, respectively;

and a third power supply signal and a fourth power supply signal received by a light-emitting element emitting light of a second color are V23 and V24, respectively;

wherein $|V13-V11|+|V14-V12|/|V23-V21|+|V24-V22|$.

2. The display panel according to claim 1, wherein the first color is red or green, and the second color is blue;

wherein $|V1-V2|<|V3-V4|$.

3. The display panel according to claim 1, wherein $|V1-V3|+|V2-V4|<|V1-V2|$; and/or, $$|V1-V3|+|V2-V4|<|V3-V4|.$$

4. The display panel according to claim 1, wherein the display panel further comprises a third display area;

the pixel circuits further comprise third pixel circuits, the first pixel circuits being connected to light-emitting elements in the third display area;

the display panel further comprises third pixel units, at least one of the third pixel units comprising a third pixel circuit and a light-emitting element connected to the third pixel circuit;

wherein at least one of the third pixel units is configured to receive a fifth power supply signal V5 and a sixth power supply signal V6, V5>V6;

wherein $$|V1-V5|+|V2-V6| \neq 0;$$

and/or $$|V3-V5|+|V4-V6| \neq 0.$$

5. The display panel according to claim 4, wherein at least one of the third pixel units comprises the light-emitting element emitting light of a third color, the first color is red, the second color is blue and the third color is green, wherein |V1–V2||V5–V6], and/or, |V5–V6|<|V3–V4|.

6. The display panel according to claim 1, wherein the first color is red or green, and the second color is blue;

wherein $|V13-V11|+|V14-V12|<|V23-V21|+|V24-V22|$.

7. The display panel according to claim 1, wherein in the first display area, a first power supply signal and a second power supply signal received by a light-emitting element emitting light of a third color are V31 and V32, respectively; and in the second display area, a third power supply signal and a fourth power supply signal received by a light-emitting element emitting light of a third color are V33 and V34, respectively;

wherein $|V13-V11|+|V14-V12||V33-V31|+|V34-V32|$; and/or, $|V23-V21|+|V24-V22||V33-V31|+|V34-V32|$.

8. The display panel according to claim 7, wherein the first color is red, the second color is blue, and the third color is green, wherein $$|V13-V11|+|V14-V12| \leq |V33-V31|+|V34-V32|;$$

and/or, $$|V23-V21|+|V24-V22| > |V33-V31|+|V34-V32|.$$

9. The display panel according to claim 1, wherein the display panel comprises a first power supply signal line and a third power supply signal line, the first power supply signal line is configured to provide the first power supply signal V1 for the first pixel units, and the third power supply signal line is configured to provide the third power supply signal V3 for the second pixel units; and/or the display panel comprises a second power supply signal line and a fourth power supply signal line, the second power supply signal line is configured to provide the second power supply signal V2 for the first pixel units, and the fourth power supply signal line is configured to provide the fourth power supply signal V4 for the second pixel units.

10. The display panel according to claim 9, wherein $|V1 \neq |V3$;

the third power supply signal line comprises a first line segment and a second line segment, the first line segment is located in the first display area, and the second line segment is located in the second display area;

a width of the first line segment is W31, and a width of the first power supply signal line is W1, wherein W31≠W1; and/or $$|V2|\neq|V4|;$$

the fourth power supply signal line comprises a third line segment and a fourth line segment, the third line segment is located in the first display area, and the fourth line segment is located in the second display area;

a width of the third line segment is W43, and a width of the second power supply signal line is W2, wherein W43≠W2.

11. The display panel according to claim 10, wherein $$W31<W1, \text{ and/or,}$$

$$W43<W2.$$

12. The display panel according to claim 10, wherein a width of the second line segment is W32, wherein W32>W31; and/or a width of the fourth line segment is W44, wherein W44>W43.

13. The display panel according to claim 10, wherein the first line segment and the second line segment are located in a same layer, and the first line segment and the first power supply signal line are located in a same layer; and/or, the third line segment and the fourth line segment are located in a same layer, and the third line segment and the second power supply signal line are located in a same layer.

14. The display panel according to claim 10, wherein the first line segment and the first power supply signal line are located in different layers, and the second line segment and the first power supply signal line are located in a same layer, and the first line segment is connected to the second line segment through a via, or the first line segment and the second line segment are located in a same layer; and/or the third line segment and the second power supply signal line are located in different layers, and the fourth line segment and the second power supply signal line are located in a same layer, and the third line segment is connected to the fourth line segment through a via, or the third line segment and the fourth line segment are located in a same layer.

15. The display panel according to claim 10, wherein the first line segment and the first power supply signal line are located in different layers, and the second line segment and the first power supply signal line are located in different layers; and/or the third line segment and the second power supply signal line are located in different layers, and the fourth line segment and the second power supply signal line are located in different layers.

16. The display panel according to claim 1, wherein $$|V1-V3|+|V2-V4|\neq 0.$$

17. The display panel according to claim 1, wherein $$0<V1<V3, \text{ and/or,}$$

$$V4<V2<0.$$

18. The display panel according to claim 1, wherein $$|V1-V3|+|V2-V4|<|V1-V2|.$$

19. A display device, comprising a display panel, wherein the display panel comprises:

a first display area and a second display area;

pixel circuits comprising first pixel circuits and second pixel circuits, at least one of the first pixel circuits being connected to at least one of light-emitting elements in the first display area, and at least one of the second pixel circuits being connected to at least one of light-emitting elements in the second display area; and first pixel units and second pixel units, at least one of the first pixel units comprising a first pixel circuit and at least one light-emitting element connected to the first pixel circuit, and at least one of the second pixel units comprising a second pixel circuit and at least one light-emitting element connected to the second pixel circuit;

wherein at least one of the first pixel units comprises the light-emitting element emitting light of a first color, at least one of the second pixel units comprises the light-emitting element emitting light of a first color, and the first color is different from the second color, wherein at least one of the first pixel units is configured to receive a first power supply signal V1 and a second power supply signal V2, V1>V2; and at least one of the second pixel units is configured to receive a third power supply signal V3 and a fourth power supply signal V4, V3>V4;

$$\text{wherein } |V1-V2||V3-V4|;$$

in the first display area, a first power supply signal and a second power supply signal received by a light-emitting element emitting light of a first color are V11 and V12, respectively; and a first power supply signal and a second power supply signal received by a light-emitting element emitting light of a second color are V21 and V22, respectively; and in the second display area, a third power supply signal and a fourth power supply signal received by a light-emitting element emitting light of a first color are V13 and V14, respectively;

and a third power supply signal and a fourth power supply signal received by a light-emitting element emitting light of a second color are V23 and V24, respectively;

$$\text{wherein } |V13-V11|+|V14-V12||V23-V21|+|V24-V22|.$$

* * * * *